(12) United States Patent
Takahashi et al.

(10) Patent No.: US 6,338,065 B1
(45) Date of Patent: Jan. 8, 2002

(54) INFORMATION SHARING APPARATUS

(75) Inventors: Noriyasu Takahashi; Hideaki Munakata; Tsuyoshi Tanaka, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/064,746

(22) Filed: Apr. 23, 1998

(30) Foreign Application Priority Data

Apr. 25, 1997 (JP) .............................................. 9-123547

(51) Int. Cl.[7] .............................................. G06F 17/30
(52) U.S. Cl. .............................. 707/10; 709/303; 712/42
(58) Field of Search ........................ 707/8–10; 709/206, 709/303; 712/42; 345/506; 364/716.04; 382/302

(56) References Cited

U.S. PATENT DOCUMENTS

| | | | | |
|---|---|---|---|---|
| 4,763,277 A | * | 8/1988 | Ashford et al. | ................ 706/47 |
| 5,600,848 A | * | 2/1997 | Sproull et al. | ................. 712/42 |
| 5,619,648 A | * | 4/1997 | Canale et al. | ............... 709/206 |
| 5,706,434 A | * | 1/1998 | Kremen et al. | .............. 709/218 |
| 5,812,524 A | * | 9/1998 | Moran et al. | ................ 370/228 |
| 5,948,054 A | * | 9/1999 | Nielsen | ........................ 709/200 |
| 5,956,486 A | * | 9/1999 | Hickman et al. | ............ 709/206 |
| 5,974,425 A | * | 10/1999 | Obermarck et al. | ......... 707/202 |
| 5,978,828 A | * | 11/1999 | Greer et al. | ................ 709/2.24 |
| 5,983,265 A | * | 11/1999 | Martino, II | ................. 709/206 |

OTHER PUBLICATIONS

Applying Evolution Algorithms to the problem of information Filtering; A. M. Tjoa; Database & Expert, Sep. 1997.*

* cited by examiner

*Primary Examiner*—Hosain T. Alam
*Assistant Examiner*—Jean Bolte Fleurantin
(74) *Attorney, Agent, or Firm*—Oliff & Berridge, PLC

(57) ABSTRACT

The present invention provides an information sharing apparatus that realizes global information sharing based on partial information which is locally released by communication. The information sharing apparatus includes information management devices each of which has a pipe management system and communicates with each other to transmit information. The pipe management system includes a pipe management part that manages a set of pipes. Each pipe has detailed items and their weights to represent a relationship between two information management devices. The pipe management system further includes a pipe retrieving part that retrieves a pipe matching a request of the user from the set of pipes managed by the pipe management part and a pipe composing part that generates a new pipe by composing retrieved pipes. The pipe management system transmits user's request to the other systems. Thereby pipes matching the request are composed to expand a pipe held by the system that originally transmitted the request.

19 Claims, 27 Drawing Sheets

EXAMPLE OF INFORMATION COLLECTION UTILIZING NETWORK OF ACQUAINTANCE

DATA STRUCTURE OF A PIPE

GENERATING AND UPDATING A PIPE WHEN RECEPTION OF A MAIL IS DETECTED

| MAIL ADDRESS | USER ID |
|---|---|
| taro@xxx.yyy.zzz | TARO |
| hanako@xxx.yyy.zzz | HANAKO |
| group25@xxx.yyy.zzz | (TARO, HANAKO, JIRO, KEIKO) |
| group30@xxx.yyy.zzz | (TOM, KAI, KEN, YUU, MEG) |

ADDRESS CONVERSION TABLE

FIG.5

Date: Fri. 29 Nov. 1996   14:54:34
To:   group25@xxx.yyy.zzz
From:   taro@xxx.yyy.zzz
Subject:   Application of Agent
Cc:   taro@xxx.yyy.zzz The following is a summary of the application example of agent technology, one of the topics of the meeting on Wednesday, Nov 27. Please complement if there is any lack.

(1)   Application in the engineering field
The tasks that are conventionally an object of application of knowledge processing system, such as design, trouble diagnosis and so on, can be processed by agent. The control task is also a region suitable to agent because it shows reactive operations.

(2)   Application in an office
It is applicable to personal information collection for example, information filtering or personal schedule management.

(3)   Others
Application in the region of traffic control such as signal control, automatic car driving and so on can be expected.

It is necessary to study regions such as learning, inference and so forth as a realizing technique of the agent. This is our imperative. I'm interested in a deduction database and I'll undertake with it at the beginning.

//Taro

EXAMPLE OF MAIL

FIG.6 agent, application, meeting, topic, agent, application, example, complement, engineering, field, application, design, trouble diagnosis, knowledge processing system, application, task, agent, process, control task, reactive, agent, region, office, application, information, filtering, personal, schedule, management, personal, information collection, application, signal control, car, automatic driving, traffic control, region, application, expect, agent, realizing technique, learning, inference, region, imperative, deduction database, interest, taro

EXTRACTED KEYWORDS

FIG.7

FIG.9  GENERATING/UPDATING PIPE WHEN TRANSMISSION OF MAIL IS DETECTED

FIG.10 DATA STRUCTURE OF PIPE AFTER UPDATE

X

| ATTRIBUTE | VALUE |
|---|---|
| a | 8.00 |
| b | 1.00 |
| c | 3.00 |
| d | 4.00 |
| e | 2.00 |
| f | 1.00 |
| g | 2.00 |
| h | 5.00 |

Y

| ATTRIBUTE | VALUE |
|---|---|
| d | 1.00 |
| e | 3.00 |
| f | 3.00 |
| g | 1.00 |
| h | 5.00 |
| i | 6.00 |
| j | 3.00 |
| k | 1.00 |
| l | 2.00 |
| m | 3.00 |
| n | 1.00 |

Z=X+Y

| ATTRIBUTE | VALUE |
|---|---|
| a | 8.00 |
| b | 1.00 |
| c | 3.00 |
| d | 4.00 |
| e | 3.00 |
| f | 3.00 |
| g | 2.00 |
| h | 5.00 |
| i | 6.00 |
| j | 3.00 |
| k | 1.00 |
| l | 2.00 |
| m | 3.00 |
| n | 1.00 |

Z=X * Y

| ATTRIBUTE | VALUE |
|---|---|
| d | 1.00 |
| e | 2.00 |
| f | 1.00 |
| g | 1.00 |
| h | 5.00 |

$z = X \cdot Y$
$= 4.00 \times 1.00 + 2.00 \times 3.00 + 1.00 \times 3.00 + 2.00 \times 1.00 + 5.00 \times 5.00$
$= 40.00$

EXAMPLE OF OPERATION ON CHARACTERISTIC VECTORS

FIG.11

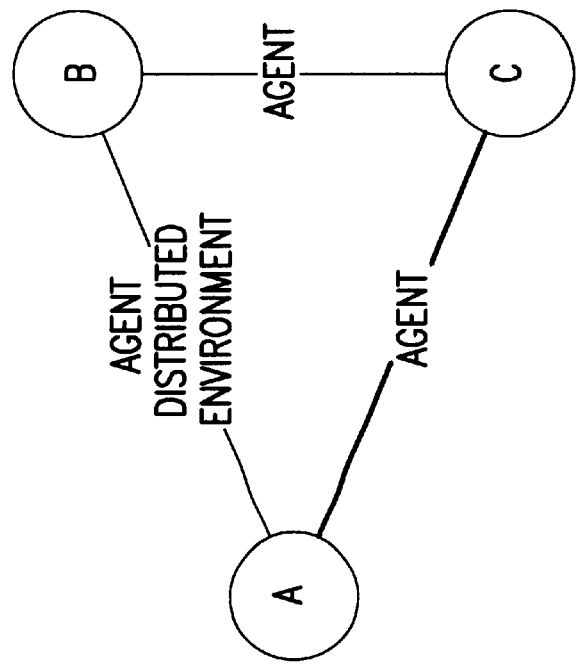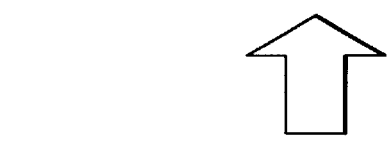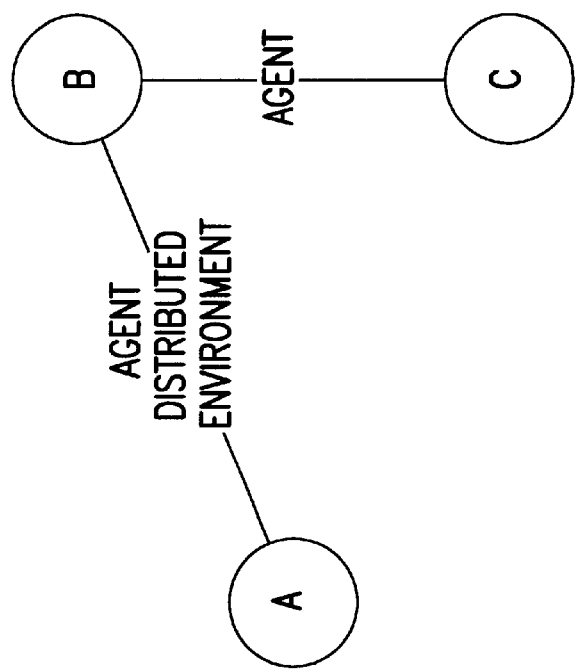
CONCEPT OF SEQUENTIAL COMPOSITION OF PIPES
FIG.12

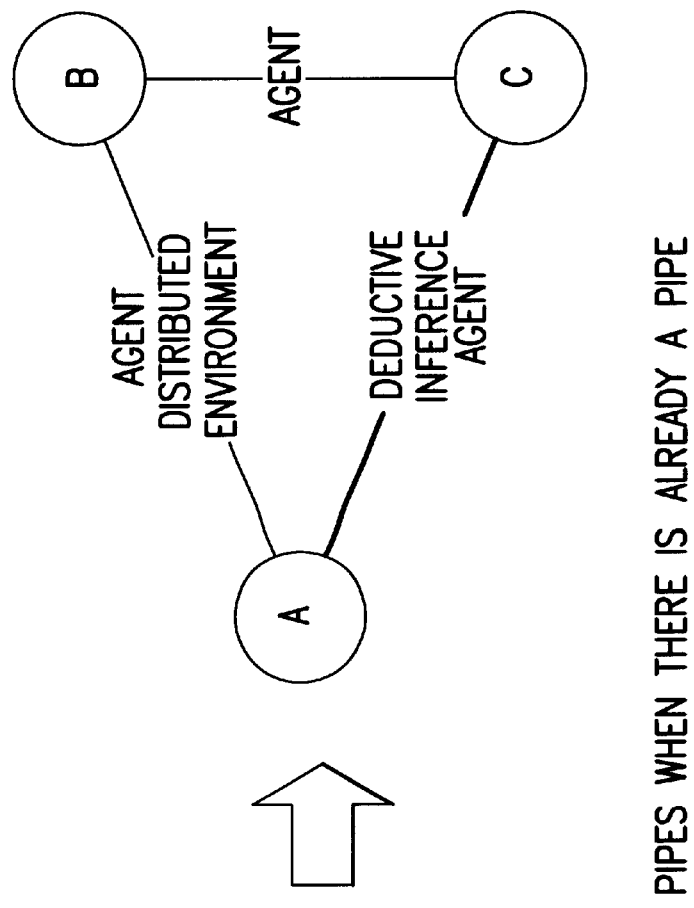
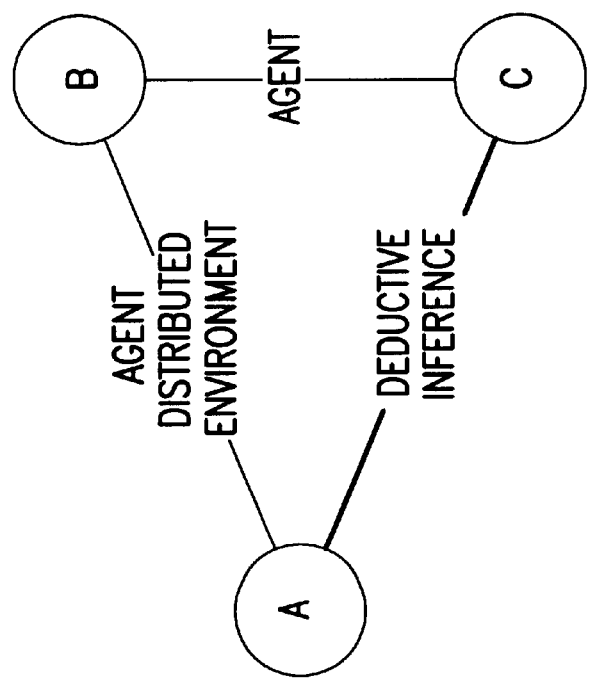
FIG. 13
SEQUENTIAL COMPOSITION OF PIPES WHEN THERE IS ALREADY A PIPE

CONCEPT OF CONVOLUTIONAL COMPOSITION OF PIPES

REQUEST: GROUP FORMATION
CONTENT: IS THERE ANY PERSON WHO KNOWS ABOUT APPLICATION OF AGENT IN AN OFFICE REGION? PARTICULARLY, A PERSON WHO IS VERY KNOWLEDGEABLE ON AN INFORMATION FILTERING AGENT IS DESIRABLE.

EXAMPLE OF REQUEST FOR GROUP FORMATION

REQUEST: INFORMATION SEARCH

CONTENT: IS THERE ANY PERSON WHO KNOWS ABOUT APPLICATION OF AGENT IN AN OFFICE REGION? PARTICULARLY, A PERSON WHO IS VERY KNOWLEDGEABLE ON AN INFORMATION FILTERING AGENT IS DESIRABLE.

EXAMPLE OF REQUEST FOR INFORMATION SEARCH

FIG.16

REQUEST: RELATIONSHIP CALCULATION
PERSON: JIRO

EXAMPLE OF REQUEST FOR RELATIONSHIP CALCULATION

FIG.17

HANDLING OF REQUEST

EXAMPLE OF REQUEST DATA
REGARDING GROUP FORMATION

EXAMPLE OF REQUEST DATA
REGARDING INFORMATION SEARCH

| FIELD NAME | VALUE |
|---|---|
| REQUEST | RELATIONSHIP CALCULATION |
| PERSON | JIRO |

EXAMPLE OF REQUEST DATA REGARDING RELATIONSHIP CALCULATION

FIG.21

| FIELD NAME | VALUE |
|---|---|
| ORIGINATOR ID | TARO |
| REQUEST DATA | x → TO DATA STRUCTURE OF REQUEST |
| TIME LIMIT | 19:10' 20 |
| MAXIMUM HOP | 5 |
| HOP COUNT | 0 |
| PIPE 1 | NULL |
| PIPE 2 | NULL |

DATA STRUCTURE OF REQUEST PROPAGATION MESSAGE

FIG.23

FIG.24 PROCESSING THE REQUEST OF INFORMATION SEARCH

FIG.25  PROCESSING THE REQUEST OF RELATIONSHIP CALCULATION

PROCESSING OF REQUEST PROPAGATION MESSAGE

| PROCESSING PATTERN | TYPE OF REQUEST | MATCHING OF P1 | VALUE OF P2 | PERSON NODE | COMPOSING PROCESS | TRANSMITTING PROCESS |
|---|---|---|---|---|---|---|
| 1 | GROUP FORMATION | YES | NOT NULL | – | SEQUENTIAL COMPOSITION | EXTENDED TRANSMISSION |
| 2 | GROUP FORMATION | NO | NOT NULL | – | CONVOLUTIONAL COMPOSITION + SEQUENTIAL COMPOSITION | EXTENDED TRANSMISSION |
| 3 | GROUP FORMATION | YES | NULL | – | – | EXTENDED TRANSMISSION |
| 4 | GROUP FORMATION | NO | NULL | – | IRREGULAR CONVOLUTIONAL COMPOSITION | EXTENDED TRANSMISSION |
| 5 | INFORMATION SEARCH | YES | NOT NULL | – | SEQUENTIAL COMPOSITION | MINIMUM TRANSMISSION |
| 6 | INFORMATION SEARCH | NO | NOT NULL | – | CONVOLUTIONAL COMPOSITION + SEQUENTIAL COMPOSITION | MINIMUM TRANSMISSION |
| 7 | INFORMATION SEARCH | YES | NULL | – | – | MINIMUM TRANSMISSION |
| 8 | INFORMATION SEARCH | NO | NULL | – | IRREGULAR CONVOLUTIONAL COMPOSITION | MINIMUM TRANSMISSION |
| 9 | RELATIONSHIP CALCULATION | – | – | NO | – | MAXIMUM TRANSMISSION |
| 10 | RELATIONSHIP CALCULATION | – | – | YES | COMBINATION OF SEQUENTIAL COMPOSITIONS | – |

PROCESSING PATTERN FOR EACH TYPE OF REQUEST

FIG.27

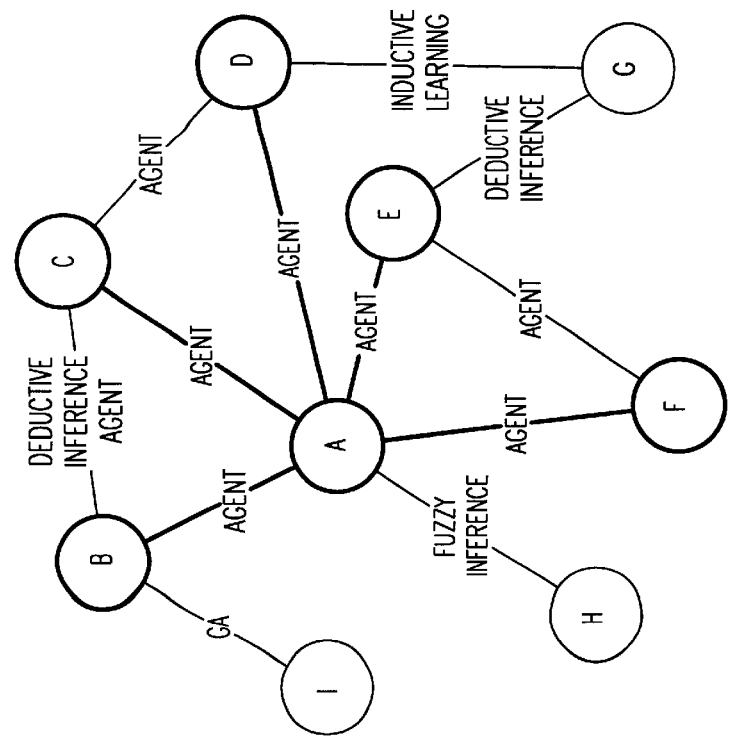
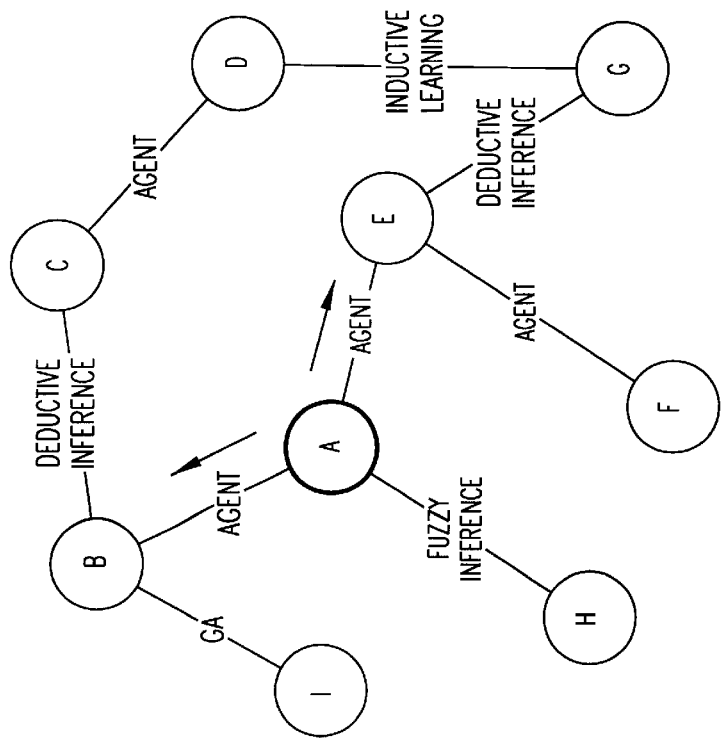
FIG.28 EXAMPLE OF EXECUTION OF THE REQUEST FOR GROUP FORMATION

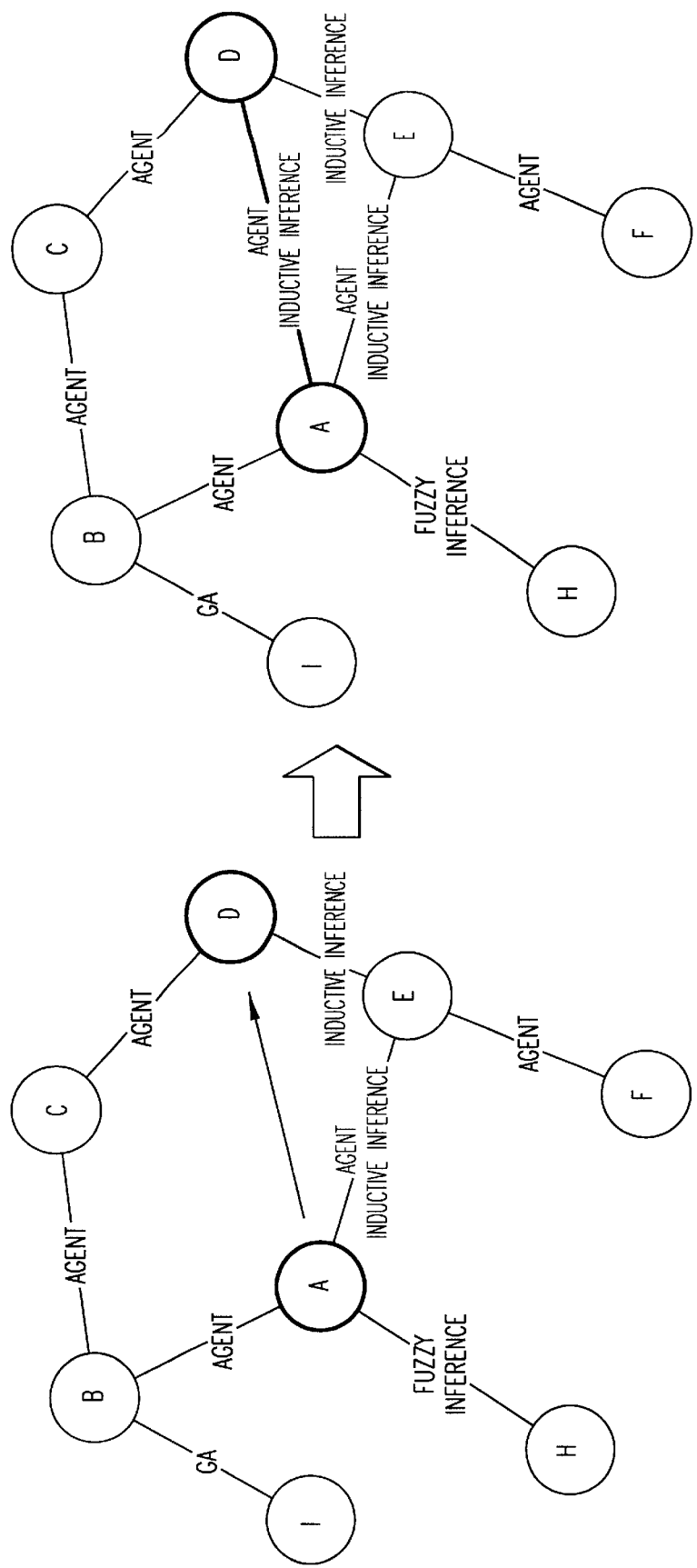
FIG.29 EXAMPLE OF EXECUTION OF THE REQUEST FOR RELATIONSHIP CALCULATION

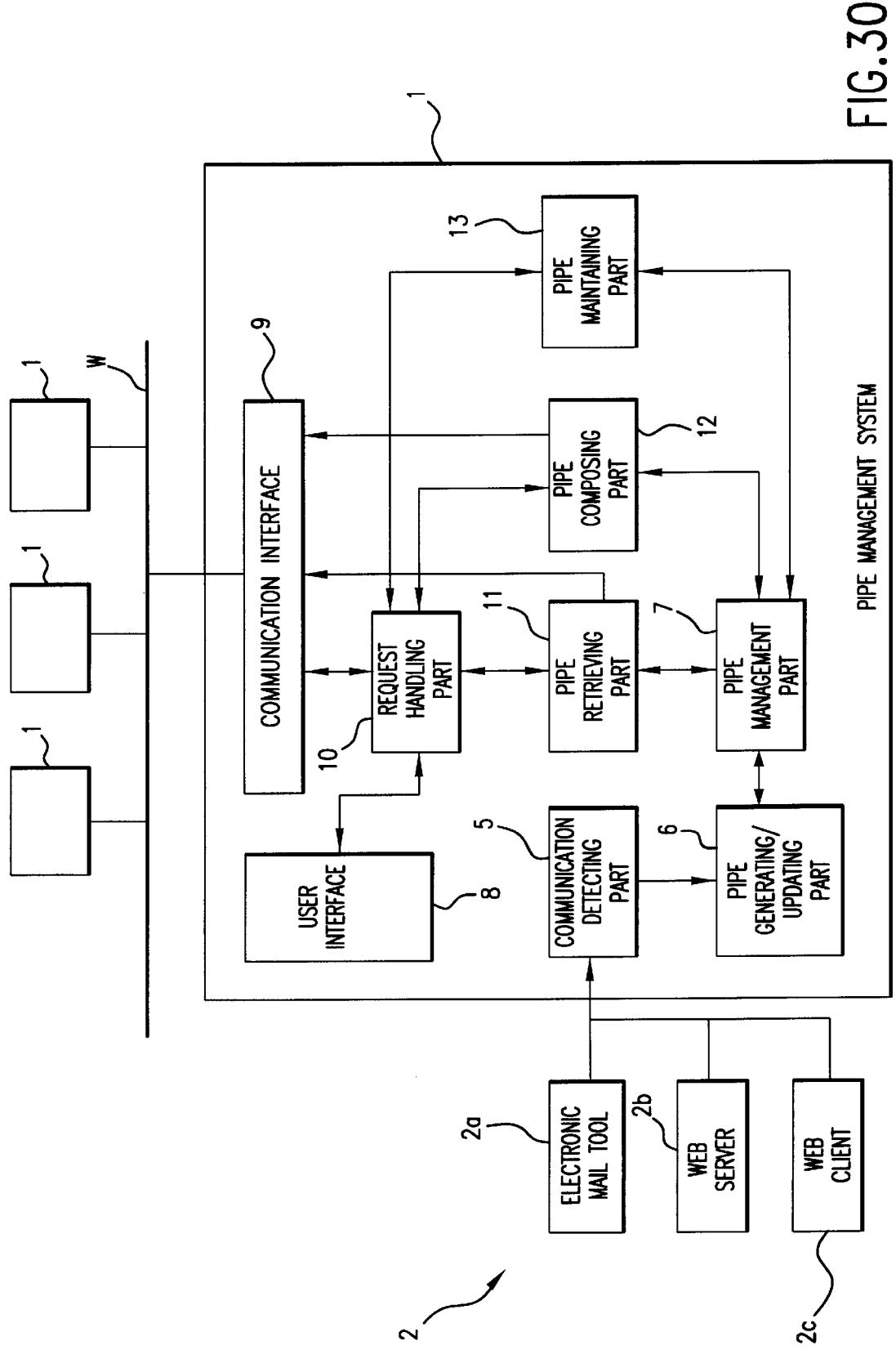

INFORMATION SHARING APPARATUS

BACKGROUND OF THE INVENTION

1. Field of the Invention

The present invention relates to an information sharing apparatus that realizes information sharing by intercommunicating information among multiple information management devices and in particular relates to an information sharing apparatus that manages relationships among the multiple information management devices as pipe information based on the intercommunication among the devices.

2. Discussion of the Related Art

Conventionally, a client-server type system using a database has been used as means for sharing information with members in a group or an organization. The system retains information in a database server in accordance with a predetermined database schema. A query to the database or storage of information is made by utilizing a database access language such as Structured Query Language (SQL) from a client application. Thus information sharing is achieved.

However, the system has a weakness of impossibility of dealing with information unconformable to the predetermined schema. Moreover, since the number or locations of the databases constituting the system are fixed, it is difficult to add a new database to the system. Therefore, it is very hard for the system to cope with situations where kinds of information to be dealt with are increased or changed.

Systems have been proposed as a first solution to the above problems. These systems realize flexible information sharing in the situations where the kinds of information to be dealt with are increased or changed by disposing means for matchmaking between an information management device of an information provider and that of an information consumer.

In these systems, a single information management device can be the information provider or information consumer depending on situations or kinds of information to be dealt with. It can also cope with a newly added information management device.

Japanese Patent Application Laid-Open No. 5-63696 (1993) discloses an intermediary communication method. In the method, a common center dealing with piece of information common to several kinds of intermediaries and a personal intermediary center are disposed. In the personal intermediary center, requested information and provider's information are examined. If conditions presented from both sides are consistent with each other, the common center provides means for realizing an intercommunication between a person who has requested the information and a person who can provide the information. Thereby matchmaking between the information requesting person and the information provider is conducted.

"Integrating Information via Matchmaking" D. Kuokka and L. Harada, Journal of Intelligent Information systems, 0, pp. 101–121 (1996) discusses an intermediary agent that intermediates between information providers and information consumers for directly connecting them and realizing flexible information sharing. The information providers send advertising messages to the intermediary agent to register their capabilities. The information consumers send requesting messages to the agent to know where necessary information exists. These messages are prescribed by a format referred to as Knowledge Query Manipulation Language (KQML). A software module capable of interpreting and generating KQML can send the messages to the intermediary agent for sharing the information.

"Kasbah: An Agent Marketplace for Buying and Selling Goods", A. Chavez and P. Maes, Proceedings of the First International Conference on the Practical Application of Intelligent Agents and Multi-Agent Technology, April 1996 discloses an idea that agents of goods seller and buyer examine goods and negotiate about prices in Kasbah Marketplace, a common place, to get a good deal. In the price negotiation, each agent has price change strategy. It is assumed that real goods are dealt with in Kasbah, but the idea can be applied for information sharing by considering the information as a kind of goods.

As a second solution to the above problems, systems that form clusters each comprising information management devices having similar information taking contents of information managed by the information management devices into consideration have been proposed.

People who are interested in a similar theme or topic can realize information sharing by utilizing these systems. In this case, a single information management device can be the information provider or information consumer depending on situations or kinds of information to be dealt with.

Japanese Patent Application Laid-Open No. 8-255178 (1996) proposes a method of increasing efficiency in information retrieval. In this method, a network topology that takes relationships between the contents of information resources into account is structured for forming clusters of information resources retaining information of the same kind. When a new information resource is added to the network, the content of the new information resource and that of an information resource having a possible relationship are compared. If the contents are similar, a link is given therebetween to maintain the network topology. In retrieving information, all information resources belonging to an objective cluster can be traced through links that match a retrieval request.

Japanese Patent Application Laid-Open No. 8-263404 (1996) (U.S. Pat. No. 5,619,648) discloses a method for scanning contents of electronic mails retained in a system and assembling specialists in a required field. For searching the specialists, a mail including a list of keywords indicating the specialized field is sent to a small number of recipients. Each recipient determines himself/herself to be the specialist or not by comparing the content of the mail and various kinds of files held by himself/herself. If the recipient determines himself/herself to be the specialist, he/she responds to the mail. The recipient further examines contents of stored mails and extracts a person who seems to be the specialist. The mail is then forwarded to the extracted person. Transmission of a mail to only a small number of recipients results in acquisition of a large number of specialists by repeating the mail forwarding step.

In "A Multi-Agent Referral System for Matchmaking", L. Foner, The First International Conference on the Practical Applications of Intelligent Agents and Multi-Agent Technology, 1996, a method of disposing means for extracting attribute of information and means for comparing attribute that compares contents of two pieces of information by utilizing attributes extracted by the means for extracting attribute for each piece of information managed by a module unit for forming clusters each comprising multiple information modules having similar contents. A hill-climbing search is applied for forming clusters, where each information module moves toward an information module having the similar information to that retained by itself. The application of the method enables to include the provider and consumer of the same kind of information in the same cluster to share the necessary information. In another application example, an interest of each member belonging to an organization is described in a document and groups based on the interests are formed by clustering the documents. Thereby information sharing is realized with members having the same interest.

The conventional systems described as the first solution require the information providers to release all pieces of information having possibilities of being accessed for properly complying the needs of the information consumers. Therefore, problems arises in that it is required to release the information to the undesirable person and that incomplete information matchmaking is conducted because not all necessary pieces of information can be released.

The conventional systems of the second solution have to examine the information retained by the information management devices in detail for forming clusters. Therefore, problems also arises in that there is a possibility of forming the clusters based on information that is not desired to be released and that a heavy processing load occurs in forming the clusters and accordingly a processing result cannot be gained rapidly.

The problem of undesirably releasing information is common to the systems of the first and second solutions. It further brings about a situation to allow a stranger to evilly use another's personal information through the Internet.

SUMMARY OF THE INVENTION

The present invention has been made in view of the above circumstances and has as an object of realization of sharing of global information based on partial information released to another person.

To achieve the object and in accordance with a purpose of the invention, as embodied and broadly described herein, an information sharing apparatus of the present invention realizes information sharing by composing a global relationship based on local relationships among information management devices.

Additional objects and advantages of the invention will be set forth in part in the description which follows and in part will be obvious from the description, or may be learned by practice of the invention.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings:

FIG. 5 shows an example of an address conversion table;

FIG. 6 shows an example of a mail;

FIG. 7 shows an example of a set of keywords extracted from the mail shown in FIG. 6;

FIG. 11 shows an example of operation of a characteristic vector;

FIG. 12 illustrates a concept of sequential composition of pipes;

FIG. 13 illustrates the concept of the sequential composition of the pipes when the pipe already exists;

FIG. 16 shows an example of a request for information search;

FIG. 17 shows an example of a request for relationship calculation;

FIG. 21 shows an example of request data of relationship calculation;

FIG. 23 shows an example of a data structure of a request propagation message;

FIG. 27 shows an example of a process pattern table;

FIG. 28 illustrates an example of execution of the request for group formation;

FIG. 29 illustrates an example of execution of the request for relationship calculation; and FIG. 30 shows a system configuration of a second embodiment of the information sharing apparatus according to the present invention.

DETAILED DESCRIPTION OF THE PREFERRED EMBODIMENTS

First Embodiment

Figure 1:
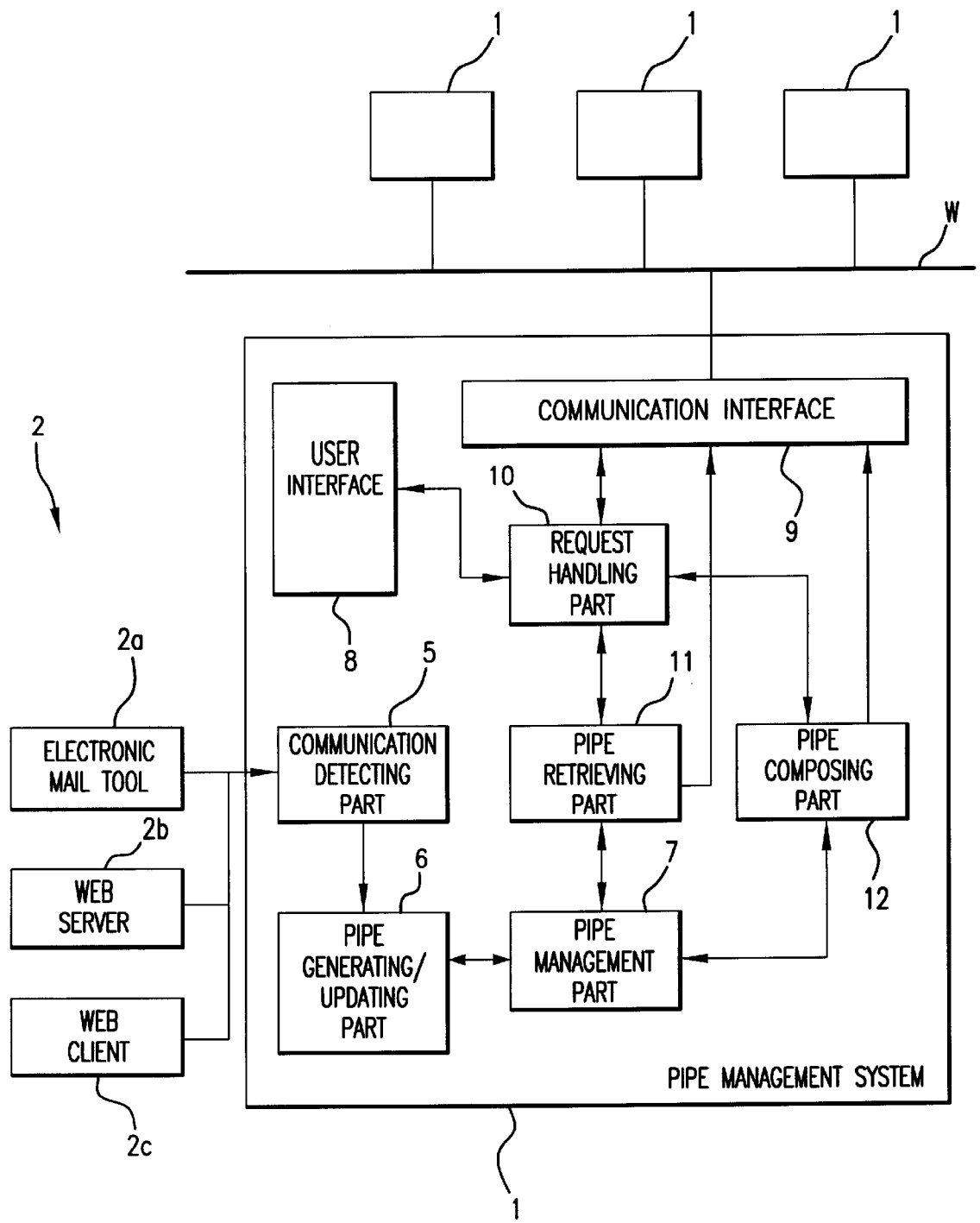
FIG. 1 shows a system configuration of a first embodiment of an information sharing apparatus according to the present invention.

FIG. 1 shows a configuration of a first embodiment of an information sharing apparatus according to the present invention.

In this description, information representing a relationship between arbitrary two persons (or systems or devices operated by them) and having a weight of the relationship is referred to as a pipe.

The information sharing apparatus includes multiple pipe management systems 1 having the same configuration connected through a network W so that they can communicate with each other. Each pipe management system 1 is connected to an information management device 2 such as an electronic mail tool 2a, a Web server 2b or a Web client 2c. The pipe management system 1 is substantially integrated with the information management device 2. Hereinafter, information managed by the information management device 2 is considered identical to information managed by the pipe management system 1.

Each pipe management system 1 belongs to each user and communicates with other users' systems 1 through the network W.

The pipe management system 1 includes a communication detecting part 5 that detects information exchange performed by the information management device 2 and a pipe generating/updating part 6 that generates and updates a pipe based on a content of information detected by the communication detecting part 5. The system 1 also includes a pipe management part 7 that manages pipes related to the system 1, a user interface 8 that accepts a request of the user, communication interface 9 that communicates with the other pipe management systems 1 and a request handling part 10 that accepts a request of the user or other information management devices 2 (other pipe management systems 1). The system 1 further includes a pipe retrieving part 11 that retrieves a pipe matching a condition from the pipes managed by the pipe management part 7 to comply with the request transmitted from the request handling part 10 and a pipe composing part 12 that generates a new pipe by composing pipes already existing and managed by the pipe management part 7 when there is no pipe matching the request from the request handling part 10.

A basic idea of the present invention will be explained using an example of a network in an office for collecting information.

For collecting information in an office, a network of acquaintances is utilized. For example, it is assumed that Mr. A, who is working on research strategy, needs to know a research trend of the theme "agent" for establishing new research strategy. Since Mr. A does not have enough knowledge about "agent", he obtains information from a colleague, Mr. B, who is very knowledgeable about "agent". Mr. A further obtains information about the research trend of "agent" from Mr. C with an introduction from Mr. B. Moreover, Mr. A comes to know that Mr. D collects materials about "agent" in a conversation with him by chance. Therefore, Mr. A also obtains information from Mr. D. These relationships have been established on daily conversation or cooperation in working.

Figure 2:
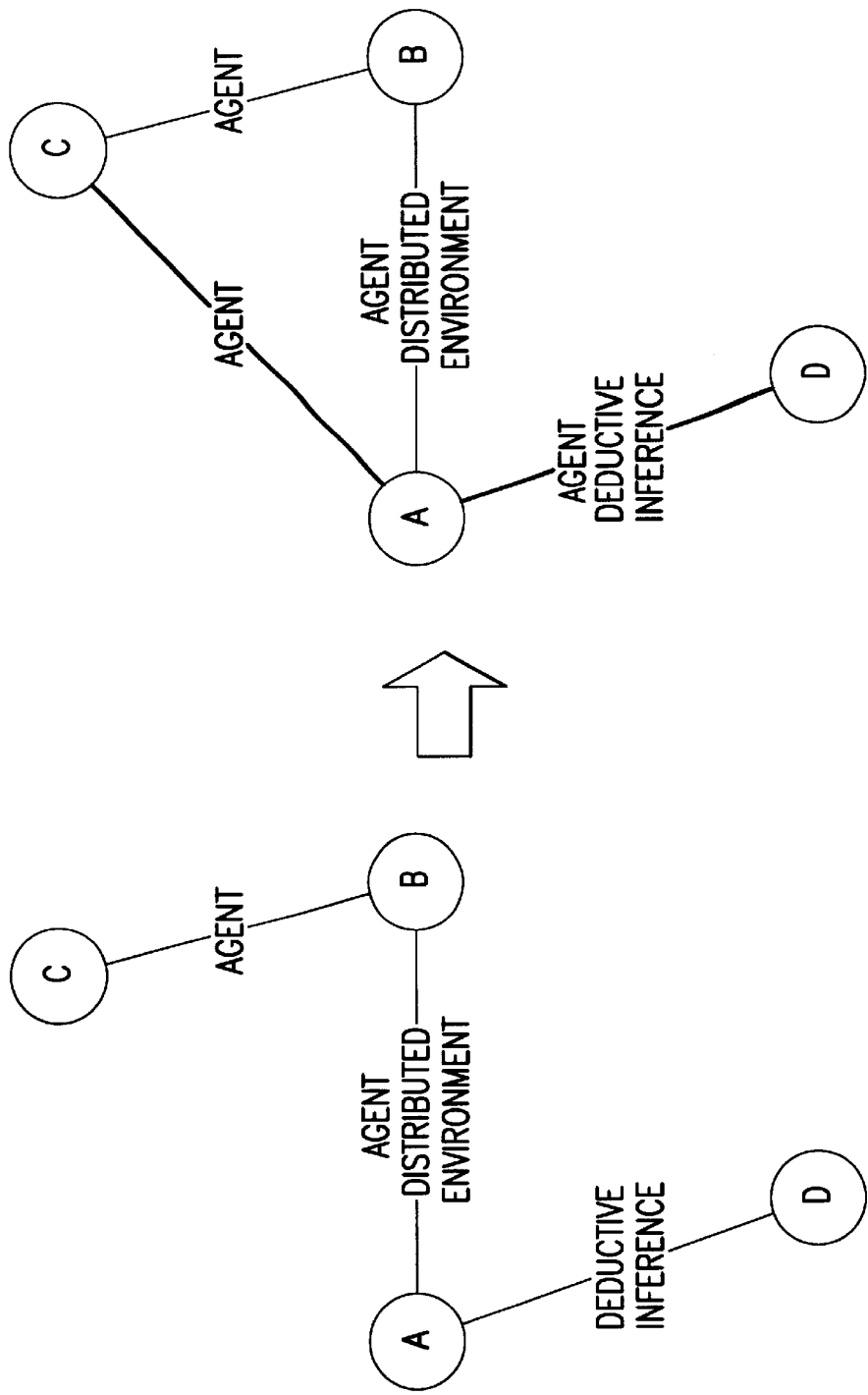
FIG. 2 is a conceptual view illustrating an example of collecting information by utilizing a network of acquaintances.

FIG. 2 illustrates the collection of information by utilizing the network. The situation of the network of the acquaintances of Mr. A before starting collection of information is shown at the left and the situation of the network accomplished by completing collection of information is shown at the right. As indicated by thick lines in the figure, Mr. A is now related to Mr. C and Mr. D, who have been unrelated to him regarding "agent", by information collection activity.

The information collection utilizing the network of the acquaintances is analyzed and the following characteristics are found.

(1) Information is obtained from an indirect acquaintance (an acquaintance of an acquaintance).

Mr. A obtains information about "agent" from Mr. C who is not a direct acquaintance with an introduction from Mr. B. Actually, in many cases, there are some hundreds or thousands of people working in an office. Therefore, efficiency in information sharing in an office is greatly increased by collecting information from indirect acquaintances.

(2) Relationships with acquaintances vary dynamically.

With an introduction from Mr. B, a new relationship is established between Mr. A and Mr. C. Furthermore, a new relationship regarding "agent" is added between Mr. A and Mr. D though they have already got acquainted with each other. In general, a relationship between people is gradually weakened as time goes by. Thus the network of the acquaintances in the office always varies.

(3) Relationships with acquaintances include various kinds of information.

Mr. A and Mr. B have a relationship regarding two topics "agent" and "distributed environment". Mr. A and Mr. D have a relationship regarding "agent" and "deductive inference".

(4) Relationships with acquaintances are bidirectional.

The relationship between Mr. A and Mr. B is not one-directional where only Mr. A collects information but is bidirectional. For example, if Mr. A obtains business strategy of "agent" of competitors, he provides the information to Mr. B.

In the present invention, attention is paid to the relationships among people having these characteristics. The information sharing is realized by managing and processing these relationships.

In the following description, each information managing entity, that is also an information sharing unit, is a person. However, the present invention is still effective though the person is replaced with an information management device such as a database. The information managing entities may be mixing of people and the information management devices such as databases. Otherwise, a set only consisting of information management devices may also be possible.

Figure 3:
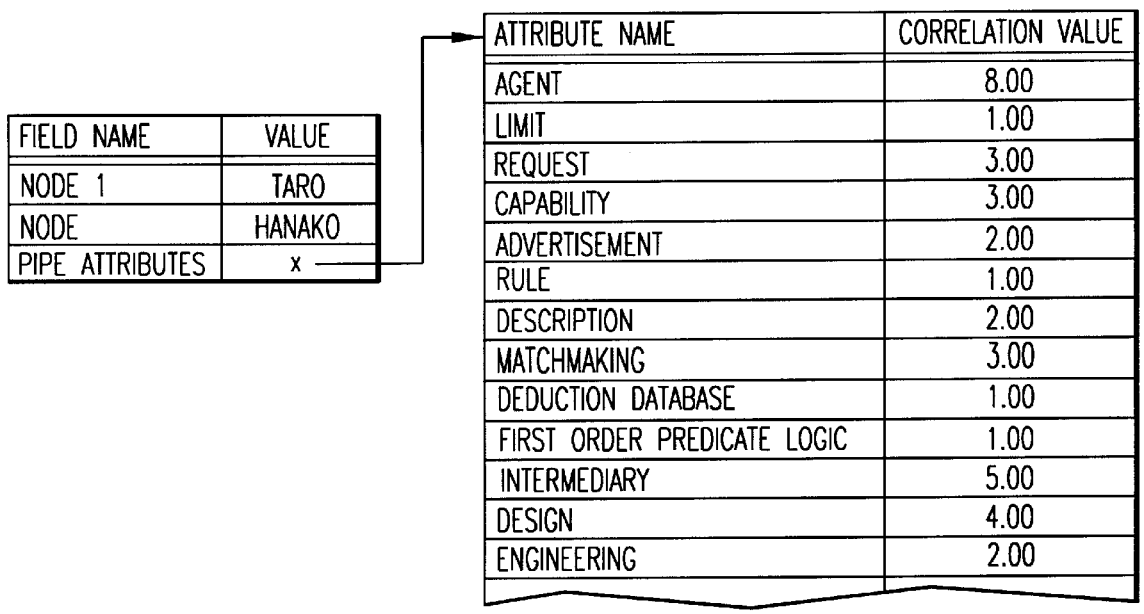
FIG. 3 shows an example of a data structure of a pipe.

In this embodiment, the relationship between people is regarded as a pipe and managed with a data structure shown in FIG. 3. The data structure comprises a "node1" field and "node2" field that represent nodes of both ends of the pipe and a "pipe attributes" field. The "pipe attributes" field is a list of pairs each consisting "attribute name" and "correlation value" representing a weight of "attribute name" and constitutes a characteristic vector represented by a multi-dimensional vector.

A pipe attributes correspond to detailed items of a relationship between nodes (between people, information management devices or the like). If a pipe is regarded as a bundle of pipe elements each having different meaning from others, each pipe attribute corresponds to each pipe element and each attribute name corresponds to a label representing each pipe element. A correlation value represent a weight of each item. When the correlation value becomes larger, the relationship between the nodes corresponding to the item is stronger.

In the example of FIG. 3, the value of "node1" is "TARO" and the value of "node2" is "HANAKO". "Pipe attribute" includes "agent", "limit", "request", "capability", "advertisement", "rule", "description", "matchmaking", "deduction database", "first order predicate logic", "intermediary", "design", and "engineering" having correlation values 8.00, 1.00, 3.00, 3.00, 2.00, 1.00, 2.00, 3.00, 1.00, 1.00, 5.00, 4.00 and 2.00, respectively.

In the following description, a pipe connecting two nodes A and B is represented as P(A, B). That is, the pipe shown in FIG. 3 is represented as P(TARO, HANAKO). Since a pipe has a bidirectional property, P(A, B) and P(B, A) represent the same pipe and only one pipe exists between an arbitrary pair of nodes A and B.

The process in the pipe management system 1 is described in detail. The communication detecting part 5 monitors the information exchange by the electronic mail system or the like and detects communication. Generation and update of the pipe is executed based on the detected communication. Other than the electronic mails, various kinds of exchange of electronic information including an access to a personal home page, conversation by chat, exchange of document files or the like are monitored. The present invention can be applied to voice communication such as phone call, the Internet phone, a net meeting and so forth by converting the voice data into electronic text information by utilizing a speech recognition technique.

The following description uses an example of the electronic mail.

The process is started with detection of transmission or reception of a mail by the communication detecting part 5.

Figure 4:
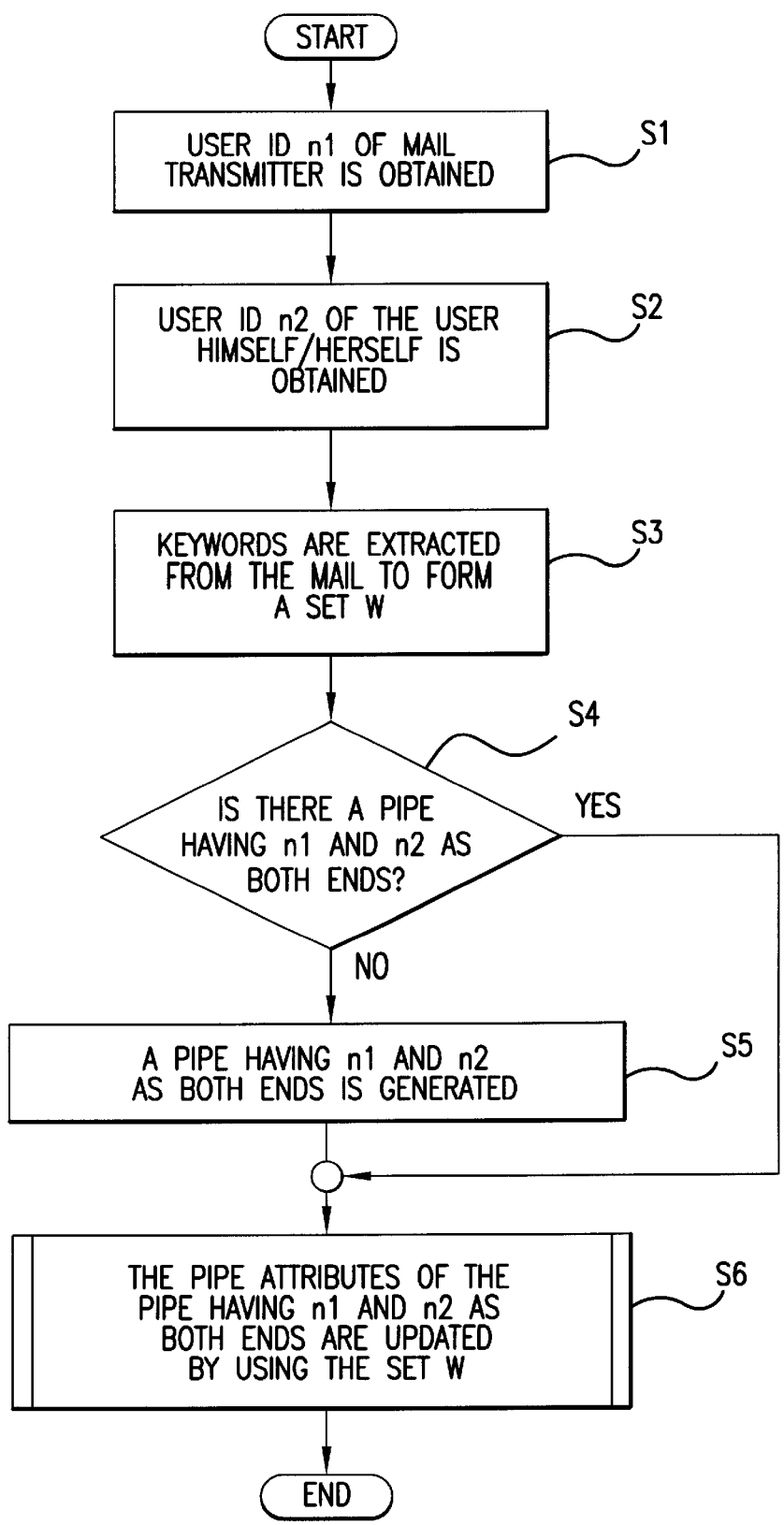
FIG. 4 is a flow chart showing processes of generating and updating a pipe when reception of a mail is detected.

FIG. 4 is a flow chart showing the process of generating and updating the pipe when reception of a mail is detected. Steps S1 through S3 are procedures executed in the communication detecting part 5 and steps S4 through S6 are procedures executed in the pipe generating/updating part 6.

When reception of a mail is detected, a user ID of a transmitter of the mail n1 is obtained (step S1). The communication detecting part 5 has an address conversion table shown in FIG. 5. The table is used for obtaining the user ID based on the address of the transmitter of the mail. The address conversion table is a set of pairs of a mail address and a user ID. Corresponding user ID is fetched based on the transmitter's address included in the mail.

In the same way, the user obtains a user ID corresponding to himself/herself, n2 (step S2). Keywords are then extracted from the mail for forming a set W (step S3). For extracting the keywords, a morphological analysis engine used in general is adopted. Otherwise, methods widely known such as extraction of words matching a pre-registered word dictionary are utilized.

In the case where the pipe management system 1 of a user "HANAKO" detects reception of a mail shown in FIG. 6, n1 is "TARO", n2 is "HANAKO" and the set of keywords W is as shown in FIG. 7.

It is examined whether the pipe having n1 and n2 as both ends exists in the pipe management part 7 of his/her own system (step S4). If there is not, a pipe having n1 and n2 as both ends is generated and registered in the pipe management part 7. The pipe attributes of the pipe having n1 and n2 as both ends are updated by utilizing the set of keywords W (step S6).

Figure 8:
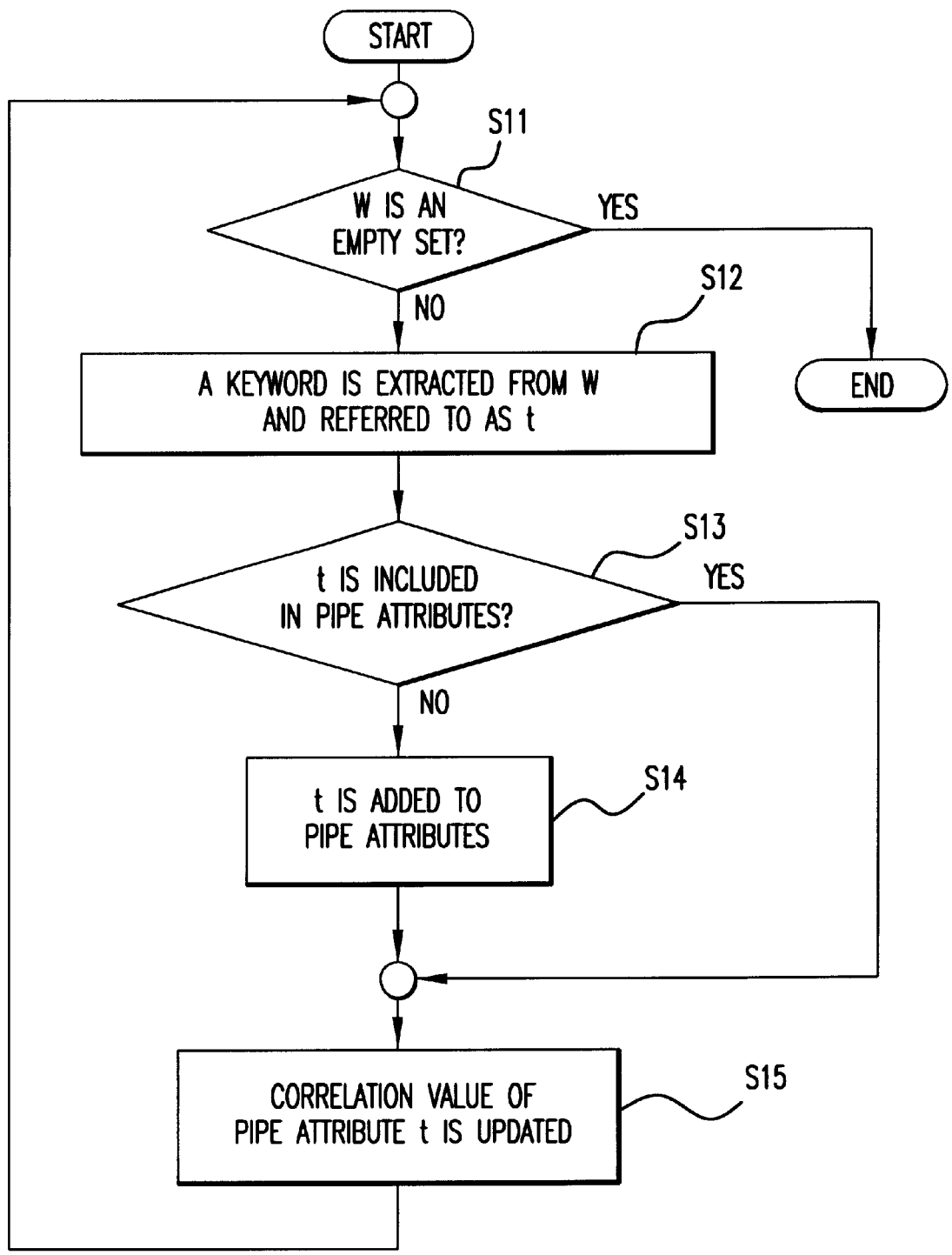
FIG. 8 is a flow chart showing an example of a process of updating a pipe attribute by utilizing the set of keywords.

The process in step S6 for updating the pipe attribute by utilizing the set of keywords W is executed by the pipe generating/updating part 6 in accordance with procedures shown in FIG. 8.

First, whether the set of keywords W is an empty set is determined (step S11). If it is the empty set, the process is completed and ends. Otherwise, if it is not the empty set, a keyword is extracted from the set W and referred to as t and is excluded from the set W (step S12). It is determined whether t is included in the pipe attributes (step S13). If t is not included in the pipe attributes, it is added thereto (step S14). The correlation value of the pipe attribute t is updated (step S15). The processes in steps S11 through S15 are executed for each keyword included in the set W.

The process in step S15 for updating the correlation value of the pipe attribute t employs, for example, the following equation:

$$V'=V+1.00$$

wherein V is a correlation value before updating and V' is a correlation value after updating.

In this example, linear value updating is performed. However, the value may be updated by utilizing a non-linear function. In general, in the case where a content or correlation value of information is represented as a multi-dimensional vector, the normalization process is executed to convert the size of the vector to 1 for comparing the content considering the direction of the vector. In the present invention, the normalization process is not adopted because the strength of a relationship between two information managing units (in this case, two users) is desired to be emphasized. However, the present invention is applicable to the case where the normalization process is employed.

Figure 9:
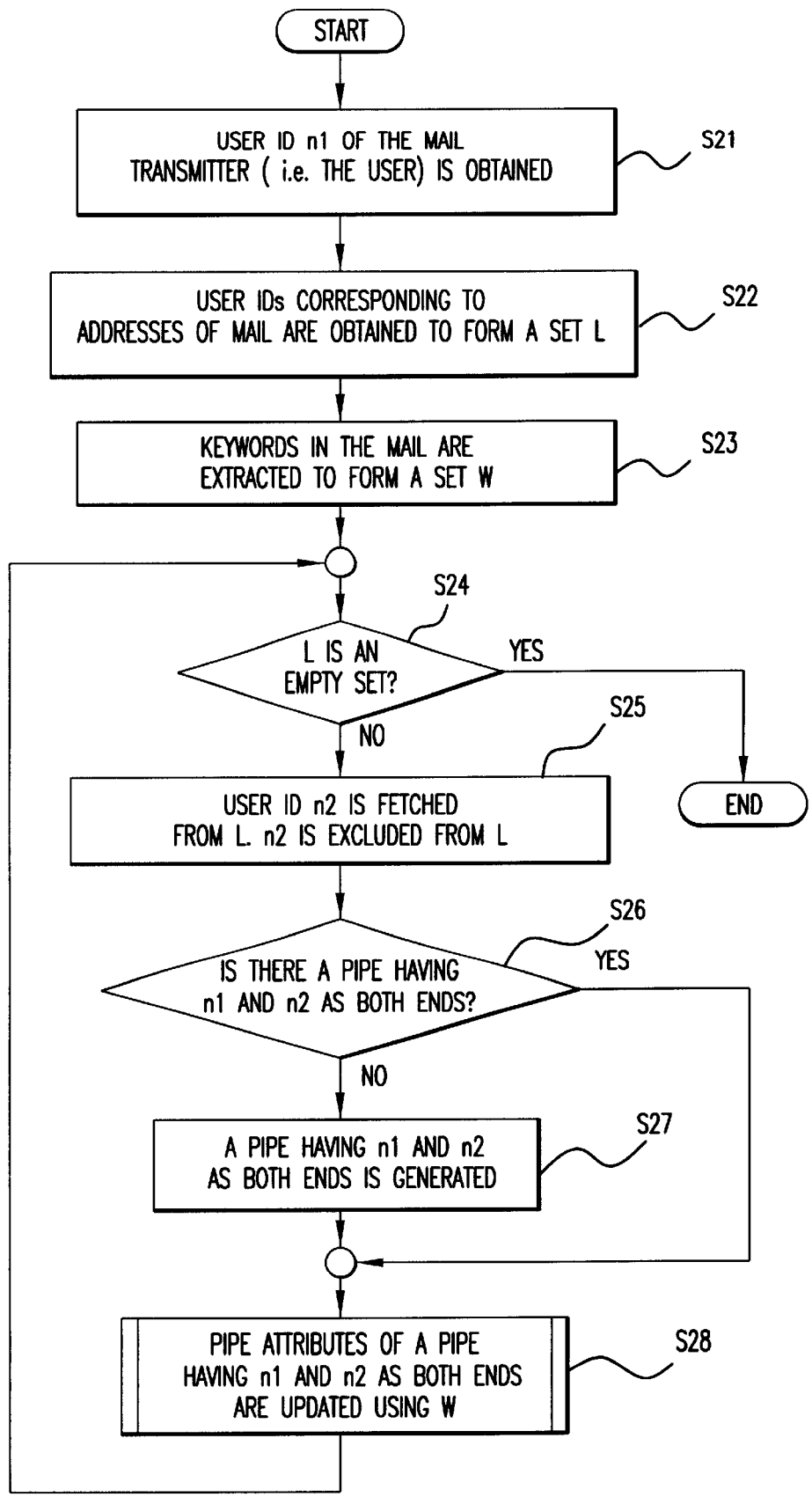
FIG. 9 is a flow chart showing an example of generating and updating a pipe when transmission of a mail is detected.

FIG. 9 is a flow chart showing the process of generating/updating a pipe when transmission of a mail is detected. Steps S21 through S25 are procedures executed in the communication detecting part 5 and steps S26 through S28 are procedures executed in the pipe generating/updating part 6.

First, the user ID of the transmitter of the mail (namely the user for himself/herself), n1, is obtained (step S21). Then user IDs corresponding to the addresses of the mail are obtained for forming a set L (step S22). Keywords in the mail are extracted and a set of the keywords W is formed (step S23).

It is determined whether the set of the IDs L is an empty set (step S24). If it is an empty set, the process is completed and ends. Otherwise, a user ID is extracted from the set L and regarded as n2 and is excluded from the set L (step S25).

Then it is determined whether a pipe having n1 and n2 as both ends exists in the pipe management part 7 of his/her own (step S26). If it does not exist, a pipe having n1 and n2 as both ends is generated (step S27). The pipe attributes are updated in the same manner as shown in FIG. 8 (step S28). The process of generating the pipe and updating the attribute is executed for each ID included in the set L.

Figure 10:
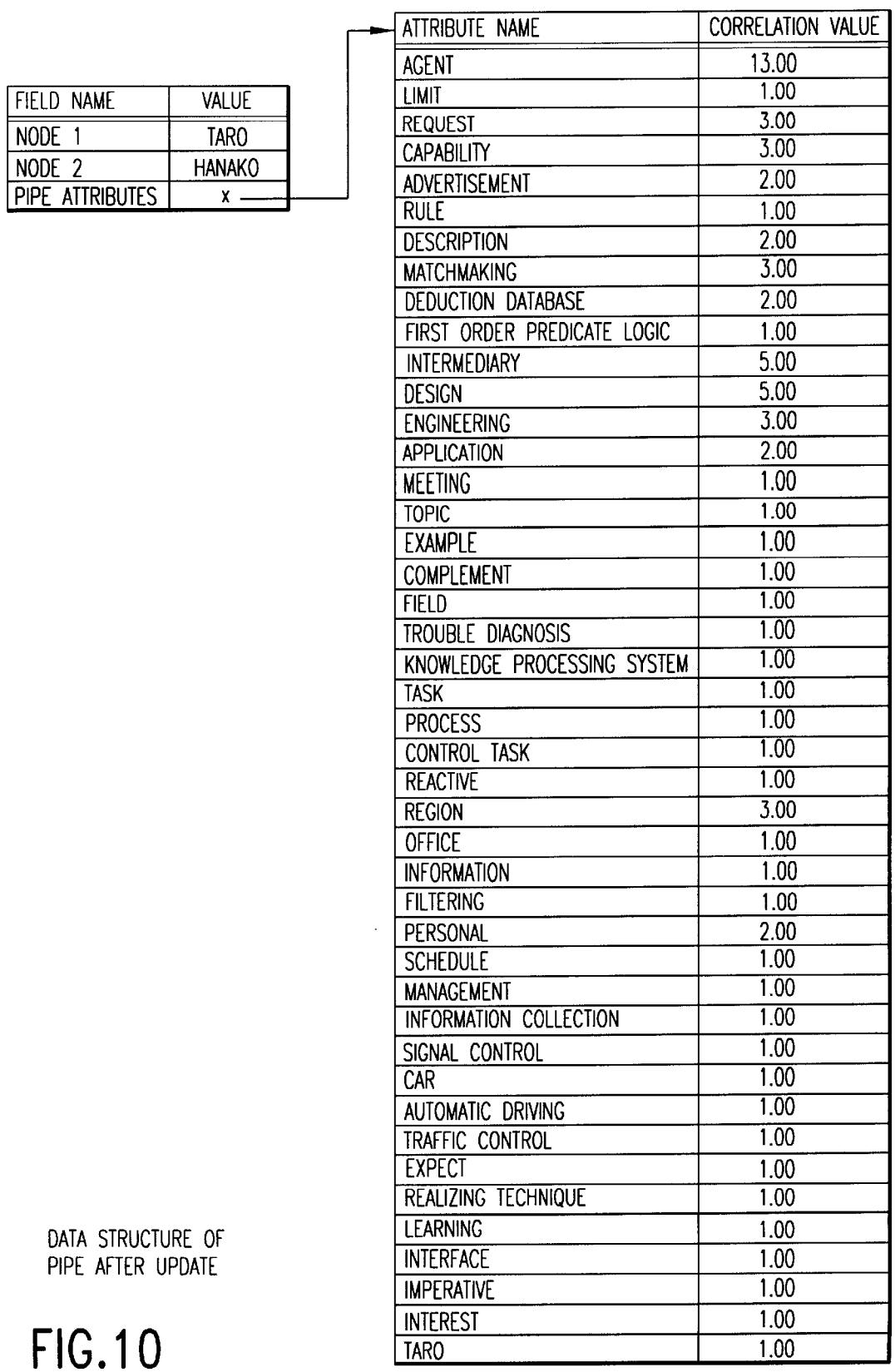
FIG. 10 shows an example of a data structure of a pipe after updating.

FIG. 10 shows a pipe as a result of the updating process executed under the condition that the pipe shown in FIG. 3 exists in the pipe management part 7 and the mail shown in FIG. 6 is received.

The pipe before updating the attributes (shown in FIG. 3) has 13 attribute names (labels) from "agent" to "engineering". A set of keywords (shown in FIG. 7) extracted from the mail is added thereto and the updated pipe obtains 44 attribute names (labels). Since "agent" appears 5 times in the set of newly extracted keywords, the correlation value of "agent" is 13.00(=8.00+5.00). A new keyword "region" appears 3 times in the set of the keywords. Therefore it is added to the pipe attribute with the correlation value 3.00. In the same way, "individual" is added with the correlation value 2.00 since it appears twice in the set of the keywords.

Before explaining the pipe composing process in the pipe management system 1, operations on the characteristic vectors constituting the pipe attributes and a basic pipe composing process using thereof are described. In this embodiment, sum, product and inner product are adopted as operations on the characteristic vectors constituting the pipe attributes.

The sum operation obtains a sum of two characteristic vectors. When two characteristic vectors X and Y are given, the sum Z of X and Y is expressed by the following equation:

$$Z=X+Y.$$

A set of attributes constituting Z is Zs that is a union of a set Xs of attributes constituting X and a set Ys of attributes constituting Y. A value $z_i$ of an arbitrary attribute of Z is a maximum value of a corresponding attribute value $x_i$ of X and a corresponding attribute value $y_i$ of Y. If there is no value corresponding to $z_i$ in X, $x_i=0$. In the same manner, if there is no value corresponding to $z_i$ in Y, $y_i=0$. Thus the following equations are established:

$$Zs=Xs \cup Ys;$$

$$z_i = \max(x_i, y_i).$$

The product operation obtains an overlapping part between two characteristic vectors. When two characteristic vectors X and Y are given, the product Z of X and Y is expressed by the following equation:

$$Z = X * Y.$$

A set of attributes constituting Z is Zs that is an intersection of a set Xs of attributes constituting X and a set Ys of attributes constituting Y. A value $z_i$ of an arbitrary attribute of Z is a minimum value of a corresponding attribute value $x_i$ of X and a corresponding attribute value $y_i$ of Y. Thus the following equations are established:

$$Zs = Xs \cap Ys;$$

$$z_i = \min(x_i, y_i).$$

The inner product operation obtains a scalar value representing a degree of matching of two characteristic vectors. When two characteristic vectors X and Y are given, the inner product z of X and Y is expressed by the following equation:

$$z = X \cdot Y.$$

The value of z is obtained by multiplying an attribute value $x_i$ of X and an attribute value $y_i$ of Y both corresponding to an arbitrary attribute of Zs and summing all products, wherein $Zs = Xs \cap Ys$. Thus the following equation is established:

$$z = \Sigma(x_i \times y_i).$$

FIG. 11 shows an example of each operation. The sets of attributes Xs and Ys for X and Y are as follows:

$$Xs = (a, b, c, d, e, f, g, h);$$

$$Ys = (d, e, f, g, h, i, j, k, l, m, n).$$

The values of the attributes are shown in the figure.

According to the summation (Z=X+Y), the set Zs of attributes is obtained as follows:

$$Zs = (a, b, c, d, e, f, g, h, i, j, k, l, m, n).$$

For example, the value of the attribute d that is common to the sets Xs and Ys is the maximum value of 4.00 and 1.00, namely 4.00.

According to the multiplication (Z=X*Y), the set Zs of attributes is obtained as follows:

$$Zs = (d, e, f, g, h).$$

For example, the value of the attribute d that is common to the sets Xs and Ys is the minimum value of 4.00 and 1.00, namely 1.00.

According to the inner multiplication (z=X·Y), the inner product is obtained by multiplying values of common attributes (d, e, f, g, h) and summing the products. Thus the inner product is 40.00.

The present embodiment employs a sequential composition and a convolutional composition as basic pipe composing processes utilizing the operation on the characteristic vectors.

In the information collection utilizing the network of acquaintances, information is often obtained from an indirect acquaintance. In this case, a new relationship is generated based on an indirect relationship. The sequential composition and the convolutional composition are the basic processes for corresponding to the generation of a new relationship. In this embodiment, various services which are described later can be realized by combining these processes.

The sequential composition of pipes is a process for generating a new pipe by performing multiplication operation on characteristic vectors and composing two sequential pipes.

FIG. 12 shows a concept of the sequential composition of pipes. A pipe P(A, B) regarding "agent" and "distributed environment" has already existed between the node A and node B. Between the node B and node C, a pipe P(B, C) regarding "agent" has already existed. This situation indicates that Mr. A and Mr. C are not acquainted with each other but there is a relationship regarding "agent" between them through Mr. B.

In this case, the attributes of the two pipes already existed are composed so that the overlapping portion is left. Thereby a new pipe directly connecting the node A and node C, namely P(A, C) is generated. The pipe attribute of P(A, C) is obtained by the multiplication of the pipe attributes of P(A, B) and P(B, C). Accordingly, the sequential composition of the pipes can be expressed by the following equation:

$$P(A,C) = P(A,B) * P(B,C).$$

As shown in FIG. 13, if there has already been a pipe P(A, C) between the node A and node C, the attributes of P(A, B) and P(B, C) are composed so that the overlapping portion is left. Then the sum of the composed attributes and the attributes of P(A, C) that has already existed is obtained. Thereby a new pipe P'(A, C) can be composed. Accordingly, in this case, the sequential composition of pipes is expressed by the following equation:

$$P'(A,C) = (P(A,B) * P(B,C)) + P(A,C).$$

The convolutional composition is a process for composing three sequential pipes and updating attributes of the second pipe.

Figures 14, 15:
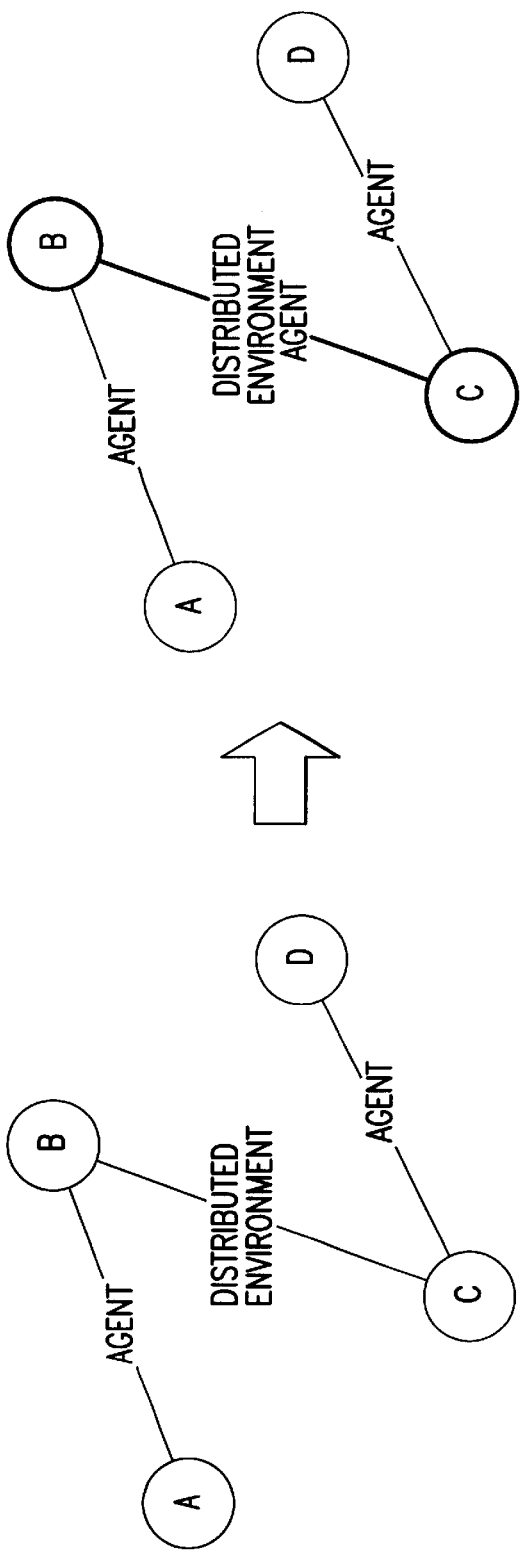
FIG. 14 illustrates a concept of convolutional composition of pipes.
FIG. 15 shows an example of a request for group formation.

FIG. 14 shows the concept of the convolutional composition. A pipe P(A, B) including an attribute regarding "agent" has already existed between the node A and node B. There has also been a pipe P(C, D) including an attribute regarding "agent" between the node C and node D. A pipe P(B, C) including an attribute regarding "distributed environment" has already existed between the node B and node C. In the situation, each of Mr. B and Mr. C does not know that the other has a pipe regarding "agent" with some other person. However, Mr. B and Mr. C have a possibility of sharing information about "agent".

The attribute regarding "agent" that is a common attribute of P(A, B) and P(C, D) is added to the pipe P(B, C) between the node B and node C. Therefore, the attribute regarding "agent" is added to P(B, C). To be more detail, the pipe attributes of P(A, B) and P(C, D) are composed so that the overlapping portion is left. The sum of the composed attributes and the attribute of P(B, C) that has already existed is then obtained. Thereby a new pipe P'(B, C) is generated. Accordingly, the convolutional composition of the pipes is expressed by the following equation:

$$P'(B,C) = (P(A,B) * P(C,D)) + P(B,C).$$

The composition processes of pipes as described above are cooperatively executed by multiple pipe management systems 1. Consequently, three kinds of services, namely "formation of a group of people related to the theme (hereinafter, referred to as group formation)", "search of information matching a request (hereinafter, referred to as information search)" and "calculation of a relationship with an arbitrary person (hereinafter, referred to as relationship calculation)" are available.

"Group formation" aims to obtain a set of people satisfying designated conditions and form a group of the people. "Information search" aims to find a person having information matching designation. "Relationship calculation" aims to obtain a relationship with a designated person by composing pipes.

For utilizing these services, the pipe management system 1 of this embodiment inputs the request through the user interface 8. The example of the request are shown in FIGS. 15, 16 and 17.

FIG. 15 shows the example of group formation request. The request is described in a text format and comprises a "request" field and a "content" field. In the "request" field, "Group Formation" is described. In the "content" field, conditions for people to be collected, a theme to be discussed and so forth are described. FIG. 16 shows the example of the information search request. The request is described in the text format and comprises a "request" field and a "content" field. In the "request" field, "Information Search" is described. In the "content" field, contents of information to be searched, prerequisites of a person to be found and so forth are described. FIG. 17 shows the example of the relationship calculation request. The request is described in the text format and comprises a "request" field and a "person" field. In the "request" field, "Relationship Calculation" is described and in the "person" field, "JIRO" is designated.

Figure 18:
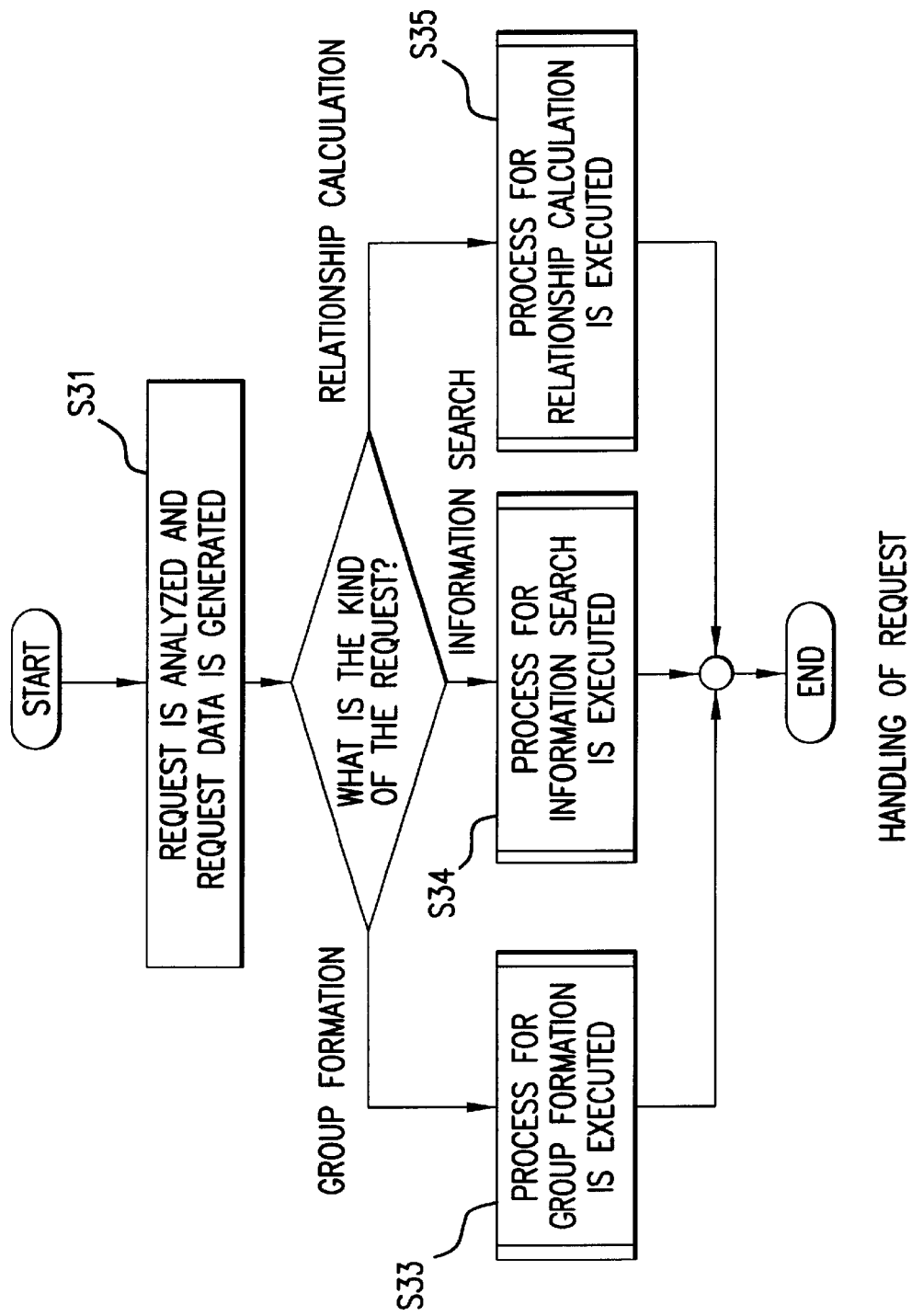
FIG. 18 is a flow chart showing a process of handling a request.

FIG. 18 shows procedures of the process for the input request. The processes of steps S31 through S35 are executed in the request handling part 10.

The request is analyzed to generate request data (step S31), and the kind of the request is determined (step S32). Based on the determination, if the request is "group formation", the process for the group formation is executed as described later (step S33). If the request is "information search", the process for the information search is executed as described later (step S34). If the request is "relationship calculation", the process for the relationship calculation is executed as described later (step S35).

Figure 19:
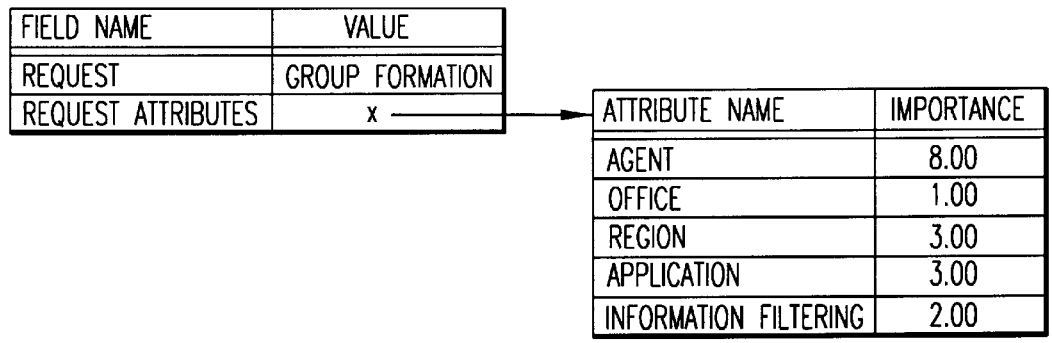
FIG. 19 shows an example of request data for group formation.
Figure 20:
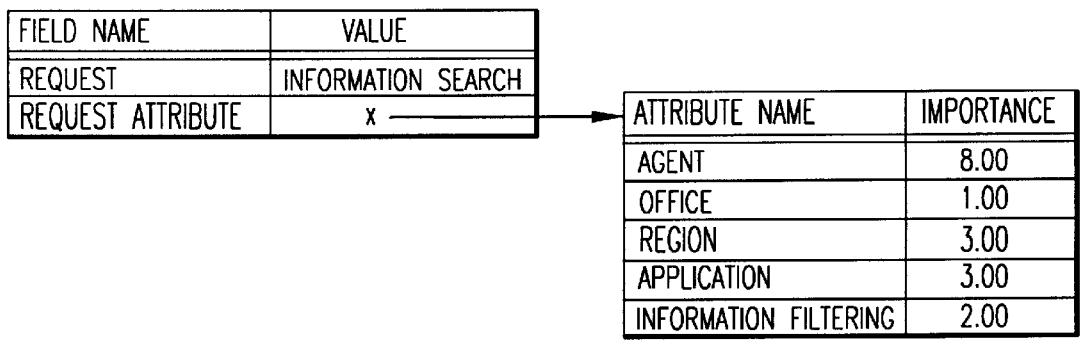
FIG. 20 shows an example of request data for information search.

The request data obtained by the process in the step S31 has example structures as shown in FIGS. 19, 20 and 21. These examples of the request data correspond to the examples of the request shown in FIGS. 15, 16 and 17, respectively.

As shown in FIGS. 19 and 20, the request data regarding "group formation" and "information search" has a "request" field indicating the kind of the request and a "request attribute" field. The "request attribute" field is a set of pairs of an "attribute name" field and "importance" field. The request attribute is generated by analyzing a text described in the "content" field in the request. In this example, a set of keywords in the text described in the "content" field is extracted by utilizing a morphological analysis engine. The extracted keywords are adopted as the attribute names and a number of times of appearance of a keyword is adopted as the value of importance.

In the process of group formation in step S33, a set of people satisfying the conditions given by the request is obtained and user IDs of the people are transmitted to the user (the pipe management system) who made the request. Thereby a group of people related to a theme is formed.

Figure 22:
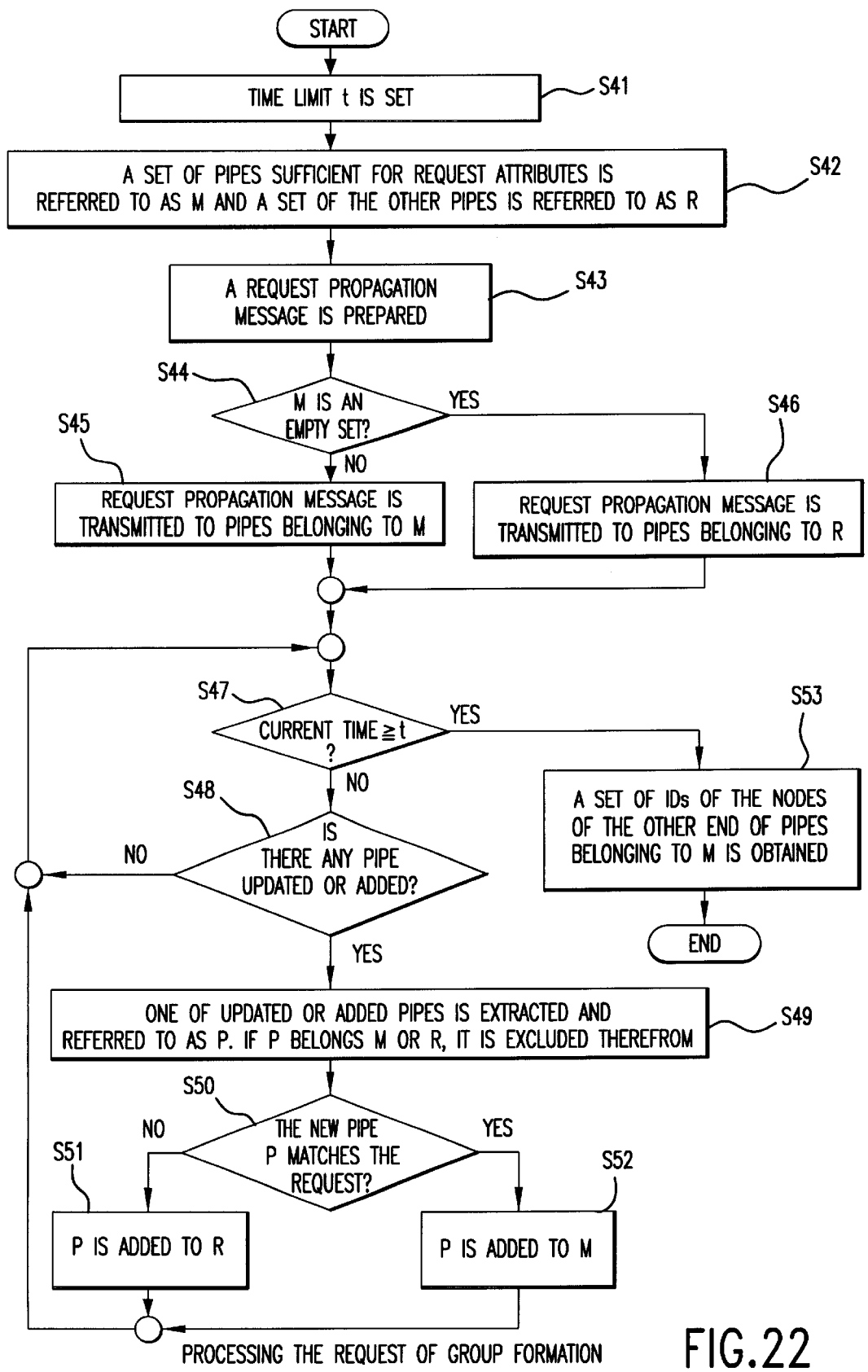
FIG. 22 is a flow chart showing an example of a process of handling the request for group formation.

FIG. 22 shows procedures of the process for group formation. The processes of steps S41 through S53 are executed in the pipe retrieving part 11.

First, to manage the execution time of the process complying with the request, a time limit t is set (step S41). In this embodiment, retrieval and composition of pipes are executed cooperatively by multiple pipe management systems 1. Therefore, it is necessary to determine when the process is completed. Here, the determination is made based on the time limit.

The value of t is set, for example, by addition of predetermined seconds to the current time. The determination of the time is executed by utilizing clocks of the computers synchronized in the network.

Among the pipes managed by his/her own pipe management part 7, a set of pipes sufficient for the request attributes is referred to as M and a set of the other pipes is referred to as R (step S42). A pipe (P), an inner product value of whose attribute and a request (Req) $z=P \cdot Req$ is larger than a predetermined value K, is determined to correspond to a request attribute. The value of K may be set common to all systems or set independently for each system. It is also possible to set the value dynamically based on a certain parameter.

The request propagation message is then prepared (step S43). The request propagation message asks the other pipe management system 1 to generate a pipe that matches a request by pipe composition. The message has the structure as shown in FIG. 23.

It is determined whether the set M is an empty set (step S44). If it is not the empty set, the request propagation message is transmitted to all pipes belonging to the set M. That is, the message is transmitted to the pipe management systems of the other end of the pipes in the set M (step S45). If the set M is the empty set, the request propagation message is transmitted to the pipes belonging to the set R. That is, the message is transmitted to the pipe management systems of the other end of the pipes in the set R (step S46).

The reason why the request propagation message is transmitted to the other pipe management systems is that more pipes matching the request can be obtained by the pipe composition. Further, the reason why the request propagation message is transmitted to the pipes belonging to the set R when the set M is an empty set (that is, there is no pipe matching the request) is that pipes matching the request are expected to be generated by the convolutional composition.

It is then determined whether the current time has passed the time limit t (step S47). If it has passed, a set of IDs of the other end of the pipes belonging to the set M is obtained (step S53) and the process is completed and ends. The set of the IDs obtained in step S53 is an answer to the given request of group formation.

Otherwise, if the current time has not passed the time limit t, update or addition of pipes is determined depending on whether there are answers from the other pipe management systems (step S48). If there is no such pipe, the process returns to step S48).

If the updated or added pipes are returned, one of them is extracted and referred to as P. If P belongs to the set M or set R, it is deleted from the set M or set R (step S49). It is then determined whether P matches the request (step S50). If it does not match the request, it is added to the set R (step S51). Otherwise, it is added to the set M (step S52) and the process returns to step S47.

Accordingly, the pipes matching the request returned from the other pipe management systems 1 are added to the set M. In step S53, this result is provided to the user who made the request.

The data structure of the request propagation message shown in FIG. 23 comprises 7 fields "originator's ID", "request data", "time limit", "maximum hop", "hop count", "pipe 1" and "pipe 2". In the "originator's ID", an ID of the original transmitter of the request propagation message is set. In the "request data", a pointer to the data structure of the corresponding request (shown in FIGS. 19 through 21) is set. In the "time limit", the time limit set in step S41 is described. The "maximum hop" and "hop count" are provided for restricting extremely extended propagation of the request propagation message to prevent a message explosion. The "hop count" counts the number of nodes (pipe management systems) the request propagation message from the original transmitter has transmitted through. The "maximum hop" indicates the limit of the value of the "hop count". The extended transmission of messages exceeding the limit is not executed. In the "pipe 1", a pointer to the preceding pipe is set. In the "pipe 2", a pointer to the pipe before the preceding pipe is set.

In the case of the request propagation message corresponding to the request of relationship calculation, pointers to all pipes in the massage transmission path are held in the message such as "pipe 3", "pipe 4", . . . , and so forth.

In the process for information search of step S34, a person (node) satisfying conditions given by a request is obtained and a user ID of the person is provided to the user who made the request.

Figure 24:
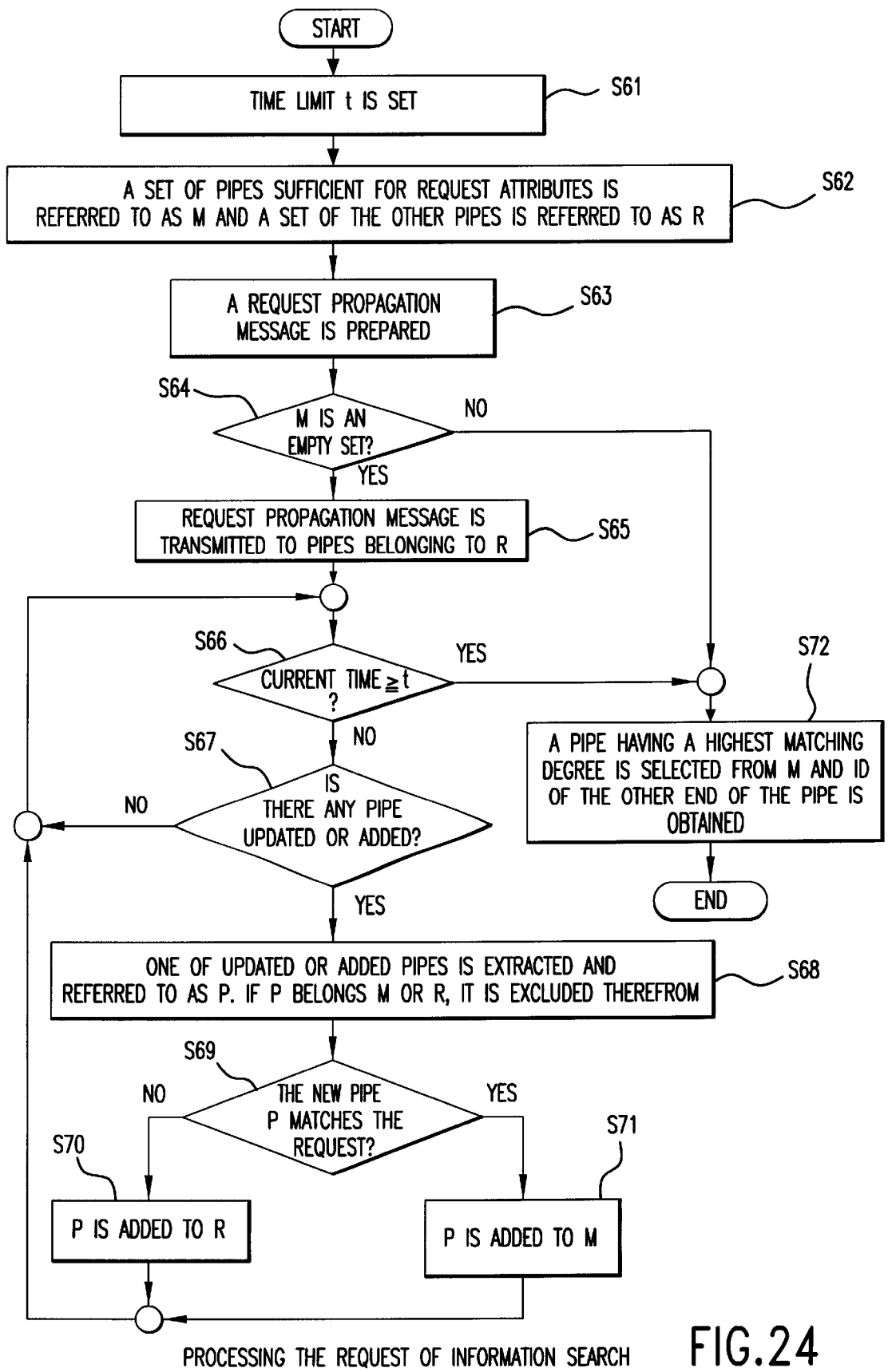
FIG. 24 is a flow chart showing an example of a process of handling the request for information search.

FIG. 24 shows procedures of the processes for information search. Processes of steps S61 through S72 are executed in the pipe retrieving part 11 of his/her own.

The processes of steps S61 through S63 are the same as those of steps S41 through S43 for processing the request of group formation. Therefore, their explanations are omitted.

In step S64, it is determined whether the set M is an empty set. If it is not the empty set, a pipe that has the highest degree of matching the request is selected from the set M and an ID of the other end of the pipe is obtained and then the process is completed and ends (step S72). The obtained ID is the answer to the request.

Otherwise, the request propagation message is transmitted to a pipe belonging to the set R (step S65). This process has the same purpose as the process handling the request for group formation in step S46. The same processes as those for processing the request for group formation in steps S47 through S52 are executed (steps S66 through S71) and the process is completed and ends.

Accordingly, the pipes matching the request returned from the other pipe management systems are added to the set M. A pipe having the highest degree of matching with the request is selected therefrom and provided to the user who made the request.

In the process for relationship calculation in step S35, a relationship with a person given by a request is obtained by the composition of pipes.

Figure 25:
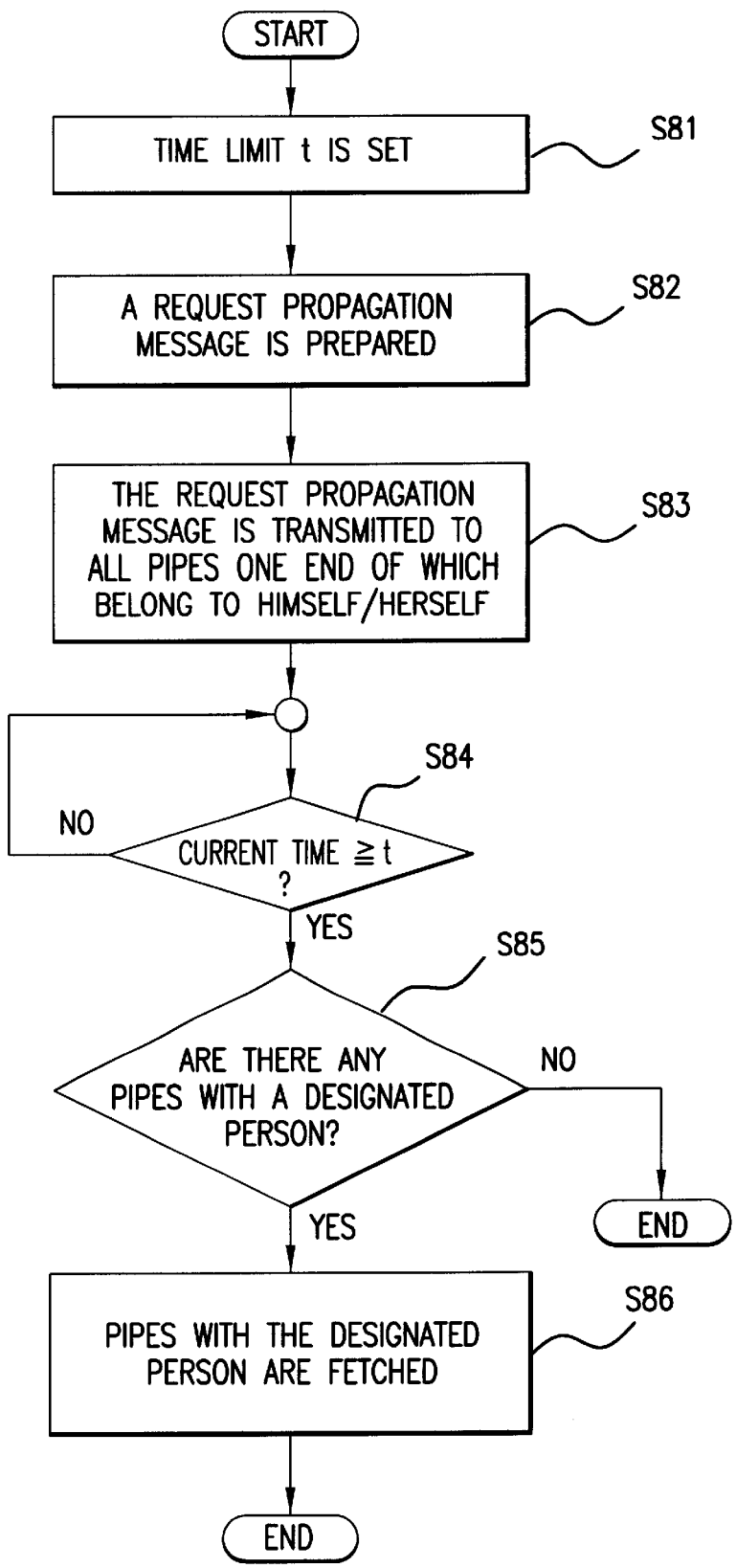
FIG. 25 is a flow chart showing an example of a process of handling the request for relationship calculation.

FIG. 25 shows procedures of processes for relationship calculation. The processes in steps S81 through S86 are executed in the pipe retrieving part 11 of his/her own.

First, the time limit t is set (step S81). The request propagation message is then prepared (step S82). The request propagation message is transmitted to all pipes one end of which is the user himself/herself (his/her own pipe management system 1) among the pipes managed by his/her own pipe management part 7 (step S83).

The process is delayed by self-loop till the time limit and answers from the other pipe management systems 1 are waited for (step S84). It is determined whether there are pipes with the designated persons in the answers (step S85). If there are not, the process of relationship calculation is considered to be failed and the process is completed and ends. Otherwise, if there are the pipes with the designated persons, those pipes are fetched and provided to the user who made the request as an answer.

In the processes of the three kinds of services described above, handling of a request propagation message by the pipe management systems 1 other than the system 1 that accepted the request from the user is important.

Figure 26:
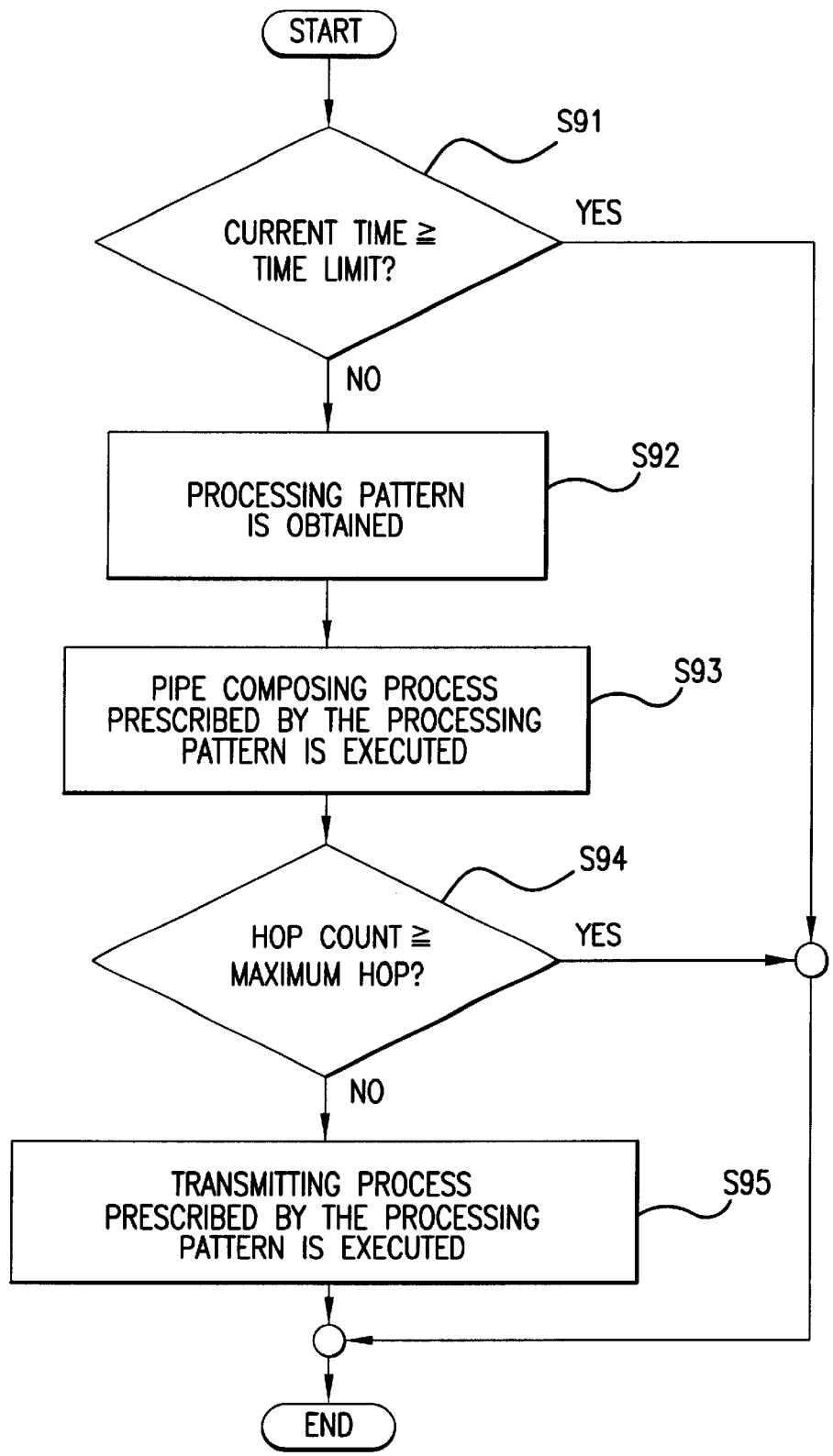
FIG. 26 is a flow chart showing an example of a process of accepting the request propagation message.

FIG. 26 shows procedures for processing the request propagation message by the other pipe management systems 1. The processes of steps S91, S92, S94 and S95 are executed by the request handling part 10 of the other systems 1 and the process of step S93 is executed by the pipe composing part 12 of the other systems 1.

First, it is determined whether the current time has passed the time limit described in the request propagation message (step S91). If it has passed, the process is completed and ends. Otherwise, a corresponding processing pattern is obtained based on the "request" field (shown in FIGS. 19 through 21), "pipe 1" field, "pipe 2" field (shown in FIG. 23) and "person" field (shown in FIG. 21) in the request propagation message (step S92).

The request handling part 10 has a table as shown in FIG. 27 used for obtaining the processing pattern. The table shows types of composing process and transmitting process that should be executed depending on patterns of the type of the request described in the request propagation message, a degree of matching of $P_1$, a value of $P_2$ and a person node. In the table, "–" means that the item does not concern with the determination of the pattern. The degree of matching of $P_1$ and the value of $P_2$ correspond to the values of the fields "pipe 1" and "pipe 2" in the request propagation message, respectively. $P_1$ represents the pipe immediately before in the message transmission path and $P_2$ represents the pipe before $P_1$.

That is, a processing pattern is obtained from the table based on the type of the request, whether $P_1$ matches the request, whether $P_2$ matches the request and whether any person is designated.

The composing process described corresponding to the obtained processing pattern is then executed (step S93). Until the hop count exceeds the maximum hop (step S94), the corresponding transmitting process is executed (step S95).

The content of each composing process executed corresponding to the processing pattern table is explained in detail. It is assumed that a pipe between nodes A and B is $P_1$ and another pipe between nodes B and C is $P_2$ ($P_1$ and $P_2$ share the node B).

The "sequential composition" is executed according to the following steps (1) through (3).

(1) The sequential composition of $P_1$ and $P_2$ is performed to obtain a new pipe P. In this case, C is an ID of the transmitter of the request propagation message. That is, an operation is executed according to the following equation:

$$P(A,C)=P_1(A,B)*P_2(B,C).$$

However, if there has already been a pipe P connecting A and C, an operation is executed according to the following equation to obtain a new pipe P':

$$P'(A,C)=P(A,C)+(P_1(A,B)*P_2(B,C))$$

(2) Generating or updating of the pipe P(A, C) or P'(A, C) is informed to C.

(3) The value of "pipe 1" in the request propagation message is changed to P(A, C) or P'(A, C). Accordingly, it will be possible to generate a pipe by composition at some other node by transmitting the request propagation message thereto. Then the generated pipe will be returned to C who has made the request.

The "convolutional composition+sequential composition" is executed according to the following steps (1) through (5).

(1) A set of pipes managed by A and matching the request is referred to as M. However, to prevent the composing process to be executed in the direction reversing the transmission path, $P_1$ is excluded from the set M.

(2) For all elements belonging to the set M, $P_3(A, X)$, the convolutional composition is executed according to the following equation for updating P(A, B):

$$P_1(A,B)'=(P_2(B,C)*P_3(A,X))+P_1(A,B).$$

(3) For $P_1(A, B)$ and $P_2(B, C)$ updated by the convolutional composition, an operation is executed according to the following equation for executing the sequential composition:

$$P(A,C)=P_1(A,B)*P_2(B,C).$$

However, if there has already been a pipe connecting A and C, an operation is executed according to the following equation to obtain a pipe P":

$$P''(A,C)=P(A,C)+(P_1(A,B)*P_2(B,C)).$$

(4) Generating or updating of a pipe P(A, C) or P"(A, C) is informed to C.

(5) The value of "pipe 1" of the request propagation message is changed to P(A, C) or P"(A, C). Accordingly, it will be possible to generate a pipe by composition at some other node by transmitting the request propagation message thereto. Then the generated pipe will be returned to C who has made the request.

The "irregular convolutional composition" is executed according to the following steps (1) through (3).

(1) A set of pipes managed by A and matching the request is referred to as M. However, $P_1$ is excluded from the set M for the same reason as described above.

(2) For all elements belonging to the set M, $P_3(A, X)$, the convolutional composition is executed according to the following equation for updating P(A, B):

$$P'_1(A,B)=(\text{Req}*P_3(A,X))+P_1(A,B).$$

Here, the convolutional composition is executed on the assumption that the request Req is a pipe.

(3) Update of the pipe P(A, B) is informed to B.

The "combined sequential composition" is executed according to the following steps (1) and (2).

(1) If $P_1(A, B)$, $P_2(B, C)$, $P_3(C, D)$, . . . , $P_n(M, N)$ is assumed, P(A, N) is composed by operating the following equation:

$$P(A,N)=P_1*P_2*P_3*\ldots*P_n.$$

However, if there has already been a pipe between A and N, the following equation is operated:

$$P'(A,N)=P(A,N)+(P_1*P_2*P_3*\ldots*P_n).$$

(2) Generation or update of the pipe P(A, N) is informed to N.

The content of processes executed in accordance with the processing pattern table for each transmission process type will be described in detail. In the following description, it is assumed that a pipe between nodes A and B before the update is $P_1$, and another pipe between nodes B and C before the update is $P_2$ ($P_1$ and $P_2$ share the node B).

When generation of a new pipe or update of a pipe is informed, the request handling part 10 of the pipe management system 1 of the user who made the request immediately reflects it in its own pipe management part 7.

The "extended transmission" is executed according to procedures of the following steps (1) through (3).

(1) The hop count is incremented.

(2) A set of pipes managed by A matching the request is referred to as M and a set of the other pipes is referred to as R.

(3) For all elements P(A, X) belonging to M if the set M is not an empty set, and for all elements P(A, X) belonging to R if the set M is the empty set, the request propagation message is transmitted to X on the assumption that $P'_1=P(A, X)$ and $P'_2=P_1$. However, items in the request propagation message not mentioned here will not be changed. The transmitter's ID in the request propagation message and the node of the pipe $P_1$ immediately before are excluded from X to prevent reverse transmission of the message.

The "minimum transmission" is executed according to procedures of the following steps (1) through (3).

(1) The hop count is incremented.

(2) A set of pipes managed by A and matching the request is referred to as M and a set of the other pipes is referred to as R.

(3) If the set M is not an empty set, the request propagation message is transmitted to X for all elements P(A, X) belonging to M on the assumption that $P'_1=P(A, X)$ and $P'_2=P_1$. However, items in the request propagation message not mentioned here will not be changed. The transmitter's ID in the request propagation message and the node of the pipe $P_1$ immediately before are excluded from X to prevent reverse transmission of the message. If the set M is the empty set, transmission of the message is completed and ends.

The "maximum transmission" is executed according to procedures of the following steps (1) and (2).

(1) The hop count is incremented.

(2) For all pipes P(A, X) managed by A, the message is transmitted to X on the assumption that $P'_1=P(A, X)$, $P'_2=P'_1$, $P'_3=P_2$, . . . , $P'_{n+1}=P_n$. However, items in the request propagation message not mentioned here will not be changed. The transmitter's ID in the request propagation message and the node of the pipe $P_1$ immediately before are excluded from X to prevent reverse transmission of the message. If the set M is the empty set, transmission of the message is completed and ends.

FIG. 28 shows an example of execution of the request for group formation. In the situation of pipe configuration shown on the left of the figure, if node A issues a request of group formation regarding "agent", the request is first transmitted to nodes B and E. These nodes further transmits the request. Transmission of the request and composition of pipes for complying with the request are repeated, and accordingly pipe configuration including attribute regarding "agent" with A as the central node is formed as shown on the right side of the figure. In the figure, the thick lines indicate the pipes regarding "agent" obtained as a result of execution of the request.

FIG. 29 shows an example of execution of the request for relationship calculation. In the situation of pipe construction shown on the left side of the figure, if a node A issues a request for calculating relationship with a node D, the request is transmitted through nodes and finally reaches the node D. Pipes are then composed to generate a pipe including attribute regarding "agent" and "inductive inference" that connects the nodes A and D as shown on the right side of the figure. In the examples shown in FIGS. 28 and 29, pipe attributes are shown as combinations of plain keywords for simplification of the concepts. However, in actual processes, pipe attributes are represented by values utilizing their vectors.

Second Embodiment

In general, a relationship between people is strengthened by communicating with each other. In contrast, if there is no communication, the relationship between the people is weakened as time passes. Based on this idea, a second embodiment provides a function for updating correlation values of pipe attributes to realize information sharing that is more conformable to actualities.

FIG. 30 shows a configuration of the second embodiment of the information sharing apparatus according to the present invention. Parts corresponding to the parts of the first embodiment have the same reference numbers as the first embodiment and their explanations are omitted.

Further to the configuration of the first embodiment shown in FIG. 1, a pipe management system 1 of the second embodiment includes a pipe maintaining part 13. The pipe maintaining part 13 detects accesses to pipes in the process for complying with a request of a user by the request handling part 10. As to a pipe attribute (label) that is very frequently accessed, a correlation value of the pipe attribute of the pipe managed by the pipe management part 7 is increased. The pipe maintaining part 13 decreases the correlation value of each pipe attribute of the pipes managed by the pipe management part 7 as time passes.

Processes of the second embodiment are different from those of the first embodiment in the following two points.

The first point is that the correlation values of the pipe attributes of the pipes obtained as a result of steps S33 through S35 shown in FIG. 18 are uniformly increased at a predetermined rate.

Specifically, V'=V*1.5 wherein V' is a correlation value after the update, V is a correlation value before the update and 1.5 is a coefficient of increment. The value of the coefficient may be predetermined for the whole system. Otherwise, it may be varied depending on circumstances.

The second point is that the correlation values of the pipe attributes of all pipes are decreased as time passes.

For example, the correlation values are updated every seven days assuming that V'=V*0.99 wherein V' is a correlation value after the update, V is a correlation value before the update and 0.99 is a coefficient of decrement. The value of the coefficient may be predetermined for the whole system. Otherwise, it may be varied depending on circumstances. The updating intervals, seven days in this example, may be flexibly changed for a practical use.

Except for the two points, the processes of the second embodiment are the same as those of the first embodiment.

In the above-described embodiments, a pipe is information having attributes (meanings) and attribute values (weights). However, even if the weights are not given to a pipe, functions intended by the present invention can be realized.

In the above-describe embodiments, a pipe may also be a bundle of pipe elements having different labels and weights. However, the data structure is not limited thereto. For a system configuration that deals with a pipe without weights, it is possible to generate the pipe as a set of labels (attributes) only.

What is claimed is:

1. An information sharing apparatus having a plurality of information management devices, the plural information management devices communicating with each other to receive or transmit information for sharing the information, comprising:

a pipe management part that manages a set of pieces of pipe information, each of the pieces of pipe information representing a bi-directional informational relationship between two of the plurality of information management devices;

a pipe retrieving part that retrieves a piece of pipe information matching a request of a user from the set of pieces of pipe information in the pipe management part; and a pipe composing part that generates a new piece of pipe information by sequential and/or convolutional composition of a plurality of pieces of pipe information retrieved by the pipe retrieving part.

2. An information sharing apparatus having a plurality of information management devices, the plural information management devices communicating with each other to receive or transmit information for sharing the information, comprising:

a pipe management part that manages a set of pieces of pipe information, each of the pieces of pipe information representing a bi-directional informational relationship between two of the plurality of information management devices and a weight of the relationship;

a pipe retrieving part that retrieves a piece of pipe information matching a request of a user from the set of pieces of pipe information in the pipe management part; and a pipe composing part that generates a new piece of pipe information by sequential and/or convolutional composition of a plurality of pieces of pipe information retrieved by the pipe retrieving part.

3. The information sharing apparatus as set forth in claim 2, further comprising a pipe maintaining part that changes the degree of relationship of one of the pieces of pipe information managed by the pipe management part in accordance with frequency of access to the piece of pipe information.

4. The information sharing apparatus as set forth in claim 1, wherein the pipe management part, the pipe retrieving part and the pipe composing part are provided to each of the plurality of information management devices, each pipe management part manages a set of pieces of pipe information related to corresponding information management device and each pipe retrieving part retrieves a piece of pipe information matching at least one of the request of the user and a request transmitted by another pipe retrieving part of another information management device from the set of pieces of pipe information managed by the corresponding pipe management part.

5. The information sharing apparatus as set forth in claim 3, wherein the pipe management part, the pipe retrieving part, the pipe composing part and the pipe maintaining part are provided to each of the plurality of information management devices, each pipe management part manages a set of pieces of pipe information related to corresponding information management device and each pipe retrieving part retrieves a piece of pipe information matching at least one of the request of the user and a request transmitted by another pipe retrieving part of another information management device from the set of pieces of pipe information managed by the corresponding pipe management part.

6. The information sharing apparatus as set forth in claim 1, further comprising:
   a communication detecting part that detects communication between the plurality of information management devices;
   a pipe generating part that generates a new piece of pipe information to be managed by the pipe management part based on the communication detected by the communication detecting part; and
   a pipe updating part that updates the piece of pipe information managed by the pipe management part based on new communication detected by the communication detecting part.

7. The information sharing apparatus as set forth in claim 1, wherein the pipe composing part generates a new piece of pipe information by a sum operation of two pieces of pipe information.

8. The information sharing apparatus as set forth in claim 7, wherein a piece of the pipe information is a bundle of a plurality of pipe elements each having a label indicating a unique name and given a weight and the pipe composing part generates a new piece of pipe information by a sum operation of the pipe elements of two pieces of the pipe information and for the pipe elements having the same label, a maximum value of their weights is selected as a weight of a new pipe element that is generated.

9. The information sharing apparatus as set forth in claim 1, wherein the pipe composing part generates a new piece of pipe information by a product operation of two pieces of the pipe information.

10. The information sharing apparatus as set forth in claim 9, wherein a piece of the pipe information is a bundle of a plurality of pipe elements each having a label indicating a unique name and given a weight and the pipe composing part generates a new piece of pipe information by a product operation of the pipe elements of two pieces of the pipe information and for the pipe elements having the same label, a minimum value of their weights is selected as a weight of a new pipe element that is generated.

11. The information sharing apparatus as set forth in claim 1, wherein the pipe composing part generates a new piece of pipe information by a product operation of a first piece of pipe information and a second piece of pipe information and a sum operation of a piece of pipe information as a result of the product operation and a third piece of pipe information, and wherein the first piece of pipe information connects two of the plurality of information management devices, the second piece of pipe information connects two of the plurality of information management devices other than those connected by the first piece of pipe information and the third piece of pipe information connects one of the information management devices connected by the first piece of pipe information and one of the information management devices connected by the second piece of pipe information.

12. The information sharing apparatus as set forth in claim 1, further comprising:
   a request handling part that returns a piece of pipe information generated by the pipe composing part matching the request of the user to an information management device of the user that originally transmitted the request and further transmits the request to another information management device, wherein a pipe management part of the information management device manages a set of pieces of pipe information connecting all information management devices matching the request by the user based on the returned piece of pipe information.

13. The information sharing apparatus as set forth in claim 1, further comprising:
   a request handling part that returns a piece of pipe information generated by the pipe composing part matching the request of the user to an information management device of the user that originally transmitted the request and further transmits the request to another information management device, wherein a pipe management part of the information management device manages a set of pieces of pipe information connecting one of the plurality of information management devices matching the request by the user based on the returned piece of pipe information.

14. The information sharing apparatus as set forth in claim 4, further comprising:
   a request handling part that returns a piece of pipe information generated by the pipe composing part matching the request of the user to an information management device of the user that originally transmitted the request and further transmits the request to another information management device provided to each information management device, wherein a pipe management part of the information management device of the user that originally transmitted the request manages a set of pieces of pipe information connecting all information management devices matching the request by the user based on the returned piece of pipe information.

15. The information sharing apparatus as set forth in claim 4, further comprising:
   a request handling part that returns a piece of pipe information generated by the pipe composing part matching the request of the user to an information management device of the user that originally transmitted the request and further transmits the request to another information management device provided to each information management device, wherein a pipe management part of the information management device of the user that originally transmitted the request manages a set of pieces of pipe information connecting one of the plurality of information management devices matching the request by the user based on the returned piece of pipe information.

16. An information sharing method using a plurality of information management devices, the plural information management devices, the plural information management devices communicating with each other to receive or transmit information for sharing the information, comprising the steps of:
   managing a set of pieces of pipe information, each of the pieces of pipe information representing a bi-directional informational relationship between two of the plurality of information management devices;
   retrieving a piece of pipe information matching a request of a user from the set of pieces of pipe information; and
   generating a new piece of pipe information by sequential and/or convolutional composition of a plurality of retrieved pieces of pipe information.

17. An information sharing method using a plurality of information management devices, the plural information management devices communicating with each other to transmit information for sharing the information, comprising the steps of:
   managing a set of pieces of pipe information, each of the pieces of pipe information representing a relationship between two of the plurality of information management devices and a weight of the relationship;

retrieving a piece of pipe information matching a request of a user from the set of pieces of pipe information; and generating a new piece of pipe information by sequential and/or convolutional composition of a plurality of retrieved pieces of pipe information.

18. A storage medium readable by computer, the storage medium storing a program of instructions executable by the computer to perform a function for sharing information by using a plurality of information management devices, the plural information management devices communicating with each other to receive or transmit information for sharing the information, the function comprising the steps of:

managing a set of pieces of pipe information, each of the pieces of pipe information representing a bi-directional informational relationship between two of the plurality of information management devices;

retrieving a piece of pipe information matching a request of a user from the set of pieces of pipe information; and generating a new piece of pipe information by sequential and/or convolutional composition of a plurality of retrieved pieces of pipe information.

19. A storage medium readable by computer, the storage medium storing a program of instruction executable by the computer to perform a function for sharing information by using a plurality of information management devices, the plural information management devices communicating with each other to receive or transmit information for sharing the information, the function comprising the steps of:

managing a set of pieces of pipe information, each of the pieces of pipe information representing a bi-directional informational relationship between two of the plurality of information management devices and a weight of the relationship;

retrieving a piece of pipe information matching a request of a user from the set of pieces of pipe information; and generating a new piece of pipe information by sequential and/or convolutional composition of a plurality of retrieved pieces of pipe formation.

* * * * *